US011010935B2

United States Patent
Trim et al.

(10) Patent No.: US 11,010,935 B2
(45) Date of Patent: May 18, 2021

(54) CONTEXT AWARE DYNAMIC IMAGE AUGMENTATION

(71) Applicant: International Business Machines Corporation, Armonk, NY (US)

(72) Inventors: Craig M. Trim, Glendale, CA (US); Shikhar Kwatra, Research Triangle Park, NC (US); Adam L. Griffin, Dubuque, IA (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/553,974

(22) Filed: Aug. 28, 2019

(65) Prior Publication Data

US 2021/0065407 A1     Mar. 4, 2021

(51) Int. Cl.
*G06T 11/00* (2006.01)
*G06K 9/00* (2006.01)
*G06F 40/279* (2020.01)

(52) U.S. Cl.
CPC .......... *G06T 11/001* (2013.01); *G06F 40/279* (2020.01); *G06K 9/00255* (2013.01); *G06K 9/00718* (2013.01)

(58) Field of Classification Search
CPC ........... G06K 9/00221; G06K 9/00201; G06K 9/00718; G06K 9/00255; G06T 11/001; H04N 13/383; G06F 40/279
See application file for complete search history.

(56) References Cited

U.S. PATENT DOCUMENTS

| 7,898,576 | B2 * | 3/2011 | Miller .................... G11B 27/34 348/222.1 |
| 9,554,093 | B2 | 1/2017 | Hua |
| 9,563,955 | B1 * | 2/2017 | Kamarshi ................. G06T 7/20 |
| 9,639,887 | B2 * | 5/2017 | McCoy ............. G06Q 30/0623 |
| 9,760,895 | B2 | 9/2017 | Morgan |
| 10,042,865 | B2 | 8/2018 | Goodwin |
| 2015/0081452 | A1 | 3/2015 | Anthony |
| 2015/0142583 | A1 | 5/2015 | Shapiro |
| 2017/0200298 | A1 | 7/2017 | Ouzts |

(Continued)

OTHER PUBLICATIONS

P. Mell, et al. "The NIST Definition of Cloud Computing", NIST Special Publication 800-145, Sep. 2011, Gaithersburg, MD.

*Primary Examiner* — Antonio A Caschera
(74) *Attorney, Agent, or Firm* — Brian Restauro; George S. Blasiak; Heslin Rothenberg Farley & Mesiti PC

(57) ABSTRACT

Methods, computer program products, and systems are presented. The method computer program products, and systems can include, for instance: obtaining image data of an image representation that is being displayed on one or more viewing device during an image representation presentation session, the image representation provided by a moving video image representation having successive frames of image data, wherein the image representation is being viewed by one or more viewer user; performing object recognition on at least one frame of image data of the successive frames of image data, and generating a list of object representations within the at least one frame of image data, the list of object representations including identifiers for respective object representations included within the image representation.

20 Claims, 11 Drawing Sheets

(56) References Cited

U.S. PATENT DOCUMENTS

2018/0322359 A1   11/2018  Kumar
2018/0356885 A1   12/2018  Ross
2018/0357479 A1*  12/2018  Swaminathan ........ G06K 9/325
2019/0043188 A1    2/2019  Wang

* cited by examiner

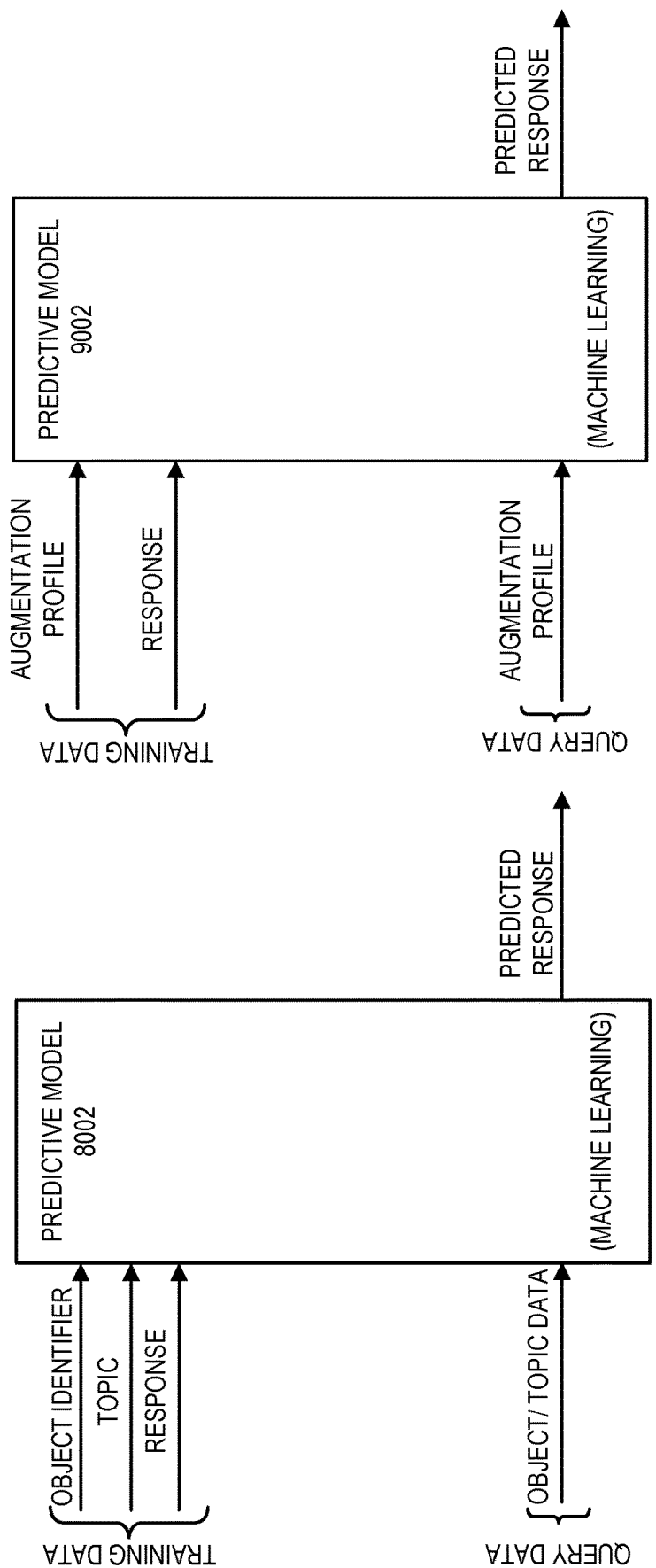

CONTEXT AWARE DYNAMIC IMAGE AUGMENTATION

BACKGROUND

Data structures have been employed for improving operation of computer system. A data structure refers to an organization of data in a computer environment for improved computer system operation. Data structure types include containers, lists, stacks, queues, tables and graphs. Data structures have been employed for improved computer system operation e.g. in terms of algorithm efficiency, memory usage efficiency, maintainability, and reliability.

Artificial intelligence (AI) refers to intelligence exhibited by machines. Artificial intelligence (AI) research includes search and mathematical optimization, neural networks and probability. Artificial intelligence (AI) solutions involve features derived from research in a variety of different science and technology disciplines ranging from computer science, mathematics, psychology, linguistics, statistics, and neuroscience. Machine learning has been described as the field of study that gives computers the ability to learn without being explicitly programmed.

Location based services (LBS) are software services that use location data to control functionality of computer systems LBS information services have a number of uses, e.g. in social networking, entertainment, security, and in a plurality of additional applications. LBS services employ location services for locating mobile computer systems. Location services can incorporate a variety of different locating service technologies such as the Global Positioning System (GPS), cellular network locating technologies, and WI-FI based locating technologies, and other technologies. One example of an LBS is a location based messaging services wherein notifications and other messages to users can be in dependence on the respective locations of the users.

SUMMARY

Shortcomings of the prior art are overcome, and additional advantages are provided, through the provision, in one aspect, of a method. The method can include, for example: obtaining image data of an image representation that is being displayed on one or more viewing device during an image representation presentation session, the image representation provided by a moving video image representation having successive frames of image data, wherein the image representation is being viewed by one or more viewer user; performing object recognition on at least one frame of image data of the successive frames of image data, and generating a list of object representations within the at least one frame of image data, the list of object representations including identifiers for respective object representations included within the image representation; evaluating one or more object referenced in the list of object representations, the evaluating including predicting an interest level of the one or more viewer user in the one or more object referenced in the list of object representations; and digitally augmenting a presented representation of at least one object referenced in the list of object representations in dependence on the evaluating the one or more object.

In another aspect, a computer program product can be provided. The computer program product can include a computer readable storage medium readable by one or more processing circuit and storing instructions for execution by one or more processor for performing a method. The method can include, for example: obtaining image data of an image representation that is being displayed on one or more viewing device during an image representation presentation session, the image representation provided by a moving video image representation having successive frames of image data, wherein the image representation is being viewed by one or more viewer user; performing object recognition on at least one frame of image data of the successive frames of image data, and generating a list of object representations within the at least one frame of image data, the list of object representations including identifiers for respective object representations included within the image representation; evaluating one or more object referenced in the list of object representations, the evaluating including predicting an interest level of the one or more viewer user in the one or more object referenced in the list of object representations; and digitally augmenting a presented representation of at least one object referenced in the list of object representations in dependence on the evaluating the one or more object.

In a further aspect, a system can be provided. The system can include, for example a memory. In addition, the system can include one or more processor in communication with the memory. Further, the system can include program instructions executable by the one or more processor via the memory to perform a method. The method can include, for example: obtaining image data of an image representation that is being displayed on one or more viewing device during an image representation presentation session, the image representation provided by a moving video image representation having successive frames of image data, wherein the image representation is being viewed by one or more viewer user; performing object recognition on at least one frame of image data of the successive frames of image data, and generating a list of object representations within the at least one frame of image data, the list of object representations including identifiers for respective object representations included within the image representation; evaluating one or more object referenced in the list of object representations, the evaluating including predicting an interest level of the one or more viewer user in the one or more object referenced in the list of object representations; and digitally augmenting a presented representation of at least one object referenced in the list of object representations in dependence on the evaluating the one or more object.

Additional features are realized through the techniques set forth herein. Other embodiments and aspects, including but not limited to methods, computer program product and system, are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 8 depicts a predictive model that can be trained with use of supervised machine learning training according to one embodiment;

FIG. 9 depicts a predictive model that can be trained with use of supervised machine learning training according to one embodiment;

DETAILED DESCRIPTION

Figure 1:
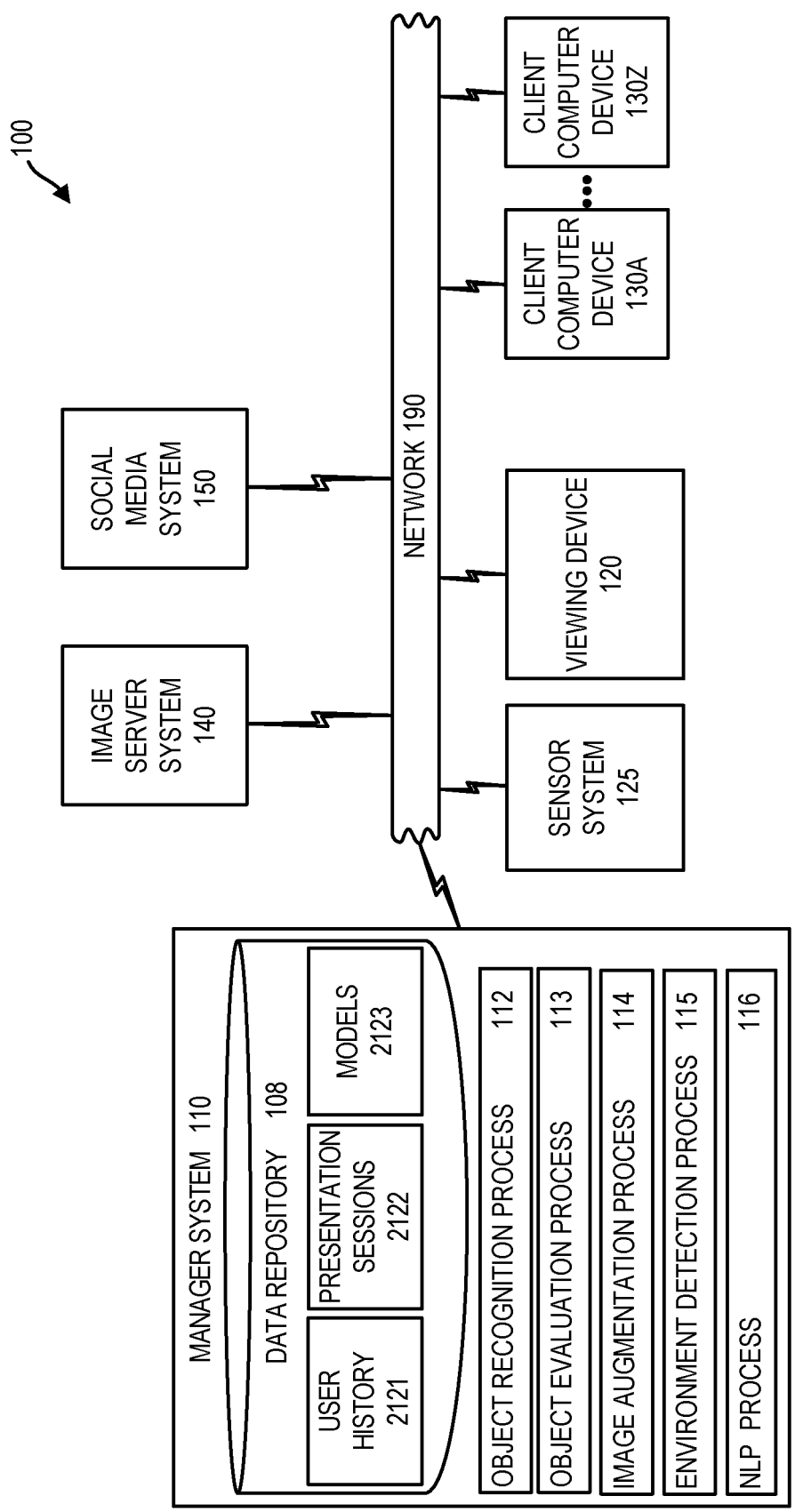
FIG. 1 depicts a system having a manager system, sensor system, a viewing device, client computer devices, an image server system, and a social media system according to one embodiment.

System 100 for use in supporting user interface functionality is shown in FIG. 1. System 100 can include manager system 110 having an associated data repository 108, one or more viewing device 120, one or more sensor system 125, client computer devices 130A-130Z, image server system 140, and social media system 150. Manager system 110, viewing device 120, sensor system 125, client computer devices 130A-130Z, image server system 140, and social media system 150 can be in communication with one another via network 190. System 100 can include numerous devices which can be computing node based devices connected by network 190. Network 190 can be a physical network and/or a virtual network. A physical network can be for example a physical telecommunications network connecting numerous computing nodes or systems such as computer servers and computer clients. A virtual network can for example combine numerous physical networks or parts thereof into a logical virtual network. In another example, numerous virtual networks can be defined over a single physical network.

In one embodiment, manager system 110 can be external to viewing device 120, sensor system 125, client computer devices 130A-130Z, image server system 140, and social media system 150. In one embodiment, manager system 110 can be collocated with one or more of viewing device 120, sensor system 125, client computer devices 130A-130Z, image server system 140, and social media system 150. According to one embodiment, system 100 can include multiple viewing devices that are provided according to viewing device 120. According to one embodiment, system 100 can include multiple image server systems 140 that are provided according to image server system 140.

Viewing device 120 of system 100 can define a user interface interacted with by one or more user of system 100. According to one embodiment, manager system 110 can be configured to control augmentation of one or more object representation (object) displayed within a frame of image data on viewing device 120. The augmentation enhances the performance of the defined user interface e.g. by prolonging a user's attention on content being displayed on viewing device 120 to thereby improve the user's comprehension of displayed content and interaction with the defined user interface. With attention on viewing device prolonged the likelihood of a user's attention being diverted from viewing device 120 wherein the user is not using the defined user interface is decreased. Embodiments herein can include multiple viewing devices 120. According to a common user case scenario, a plurality of viewing devices 120 can be provided by client computer devices 130A-130Z on which instances of viewing device 120 can be collocated.

Each of the different client computer devices 130A-130Z can be associated to a different user. Regarding one or more client computer device 130A-130Z, a computer device of one or more client computer device 130A-130Z in one embodiment can be a computing node device provided by a client computer, e.g. a mobile device, e.g. a smartphone or tablet, a laptop, smartwatch or PC.

Image server system 140 can be configured to serve image representations such as still image representations and moving video image representations to clients such as viewing device 120 and client computer devices 130A-130Z. Still image representations can include a single frame of image data and moving video image representations can include successive frames of image data that are successively served for display. For serving image representations image server system 140 can be configured to operate in accordance with the Real-time Transport Protocol (RTP), which is set forth in Requests for Comments (RFC) 3550, published by the Internet Engineering Taskforce (IETF) and the Internet Society (ISOC). Image server system 140 can be configured to serve moving video data from a live video source such as a video camera disposed at an event venue, or from a stored video source such as a stored video file. Image server system 140 can be configured to spawn image serving virtual machines on demand to facilitate transitioning from a first mode in which a first client of a first user receives moving video data in common with moving video data being received by a plurality of other clients of other users to a second mode in which the first client of the first user receives custom moving video data. Image server system 140 according to one embodiment can be provided by an image representing sharing website.

Social media system 150 can include a collection of files, including for example, HTML files, CSS files, image files, and JavaScript files. Social media system 150 can be a social website such as FACEBOOK® (Facebook is a registered trademark of Facebook, Inc.), TWITTER® (Twitter is a registered trademark of Twitter, Inc.), LINKEDIN® (LinkedIn is a registered trademark of LinkedIn Corporation), or INSTAGRAM® (Instagram is a registered trademark of Instagram, LLC). Computer implemented social networks incorporate messaging systems that are capable of receiving and transmitting messages to client computers of participant users of the messaging systems. Messaging systems can also be incorporated in systems that that have minimal or no social network attributes. A messaging system can be provided by a short message system (SMS) text message delivery service of a mobile phone cellular network provider, or an email delivery system. Manager system 110 can include a messaging system in one embodiment. During a process of registration wherein a user of system 100 registers as a registered user of system 100, a user sending registration data can send with permission data defining the registration data a permission that grants access by manager system 110 to data of the user within social media system 150. On being registered, manager system 110 can examine data of social media system 150 e.g. to determine whether first and second users are in communication with one another via a messaging system of social media system 150. A user can enter registration data using a user interface displayed on a client computer device of client computer devices 130-130Z. Entered registration data can include e.g. name, address, social media account information, other contact information, biographical information, background information, preferences information, and/or permissions data e.g. can include permissions data defining permission to allow manager system 110 to query data of a social media account of a user provided by social media system 150 including messaging system data and any other data of the user. When a user opts-in to register into system 100 and grants system 100 permission to access data of social media system 150, system 100 can inform the user as to what data is collected and why, that any collected personal data may be encrypted, that the user can opt out at any time, and that if the user opts out, any personal data of the user is deleted. Embodiments herein recognize that social media system 150 can incorporate functionality of image server system 140. Where social media system 150 incorporates image server system functionality, image server system 140 can be regarded to be co-located with social media system 150.

According to one embodiment, viewing device 120 can be external to client computer devices 130A-130Z. According to one embodiment, viewing device 120 can be collocated with a client computer device of client computer devices 130A-130Z. According to one embodiment, viewing device 120 can be provided in a venue in which multiple users view viewing device 120 simultaneously to define a multi-user viewing environment. A multi-user venue can alternatively be characterized by multiple venues, e.g. image server system 140 can broadcast a common image representation to multiple different users having respective client computer devices, wherein the users and their respective client computer devices are distributed throughout a plurality of venues. According to another embodiment, viewing device 120 can be a personalized viewing device viewed by one user. In such an embodiment, viewing device 120 can be collocated with a client computer device of client computer devices 130A-130Z. Manager system 110 according to one embodiment can be configured to control augmentation of objects represented in displayed image representations using historical data collected prior to a current image data presentation system. According to one embodiment, manager system 110 can be configured to control augmentation of objects represented in displayed image representations using feedback data obtained during a current image data presentation session. According to one embodiment, manager system 110 can be configured to control augmentation of an object represented in displayed image representations displayed on viewing device 120 using a combination of historical data collected prior to a current presentation session as well as live feedback data collected during a current image data presentation session. Live feedback herein can be regarded as real time feedback data.

Data repository 108 can store various data. In user history area 2121, data repository 108 can store historical data that specifies preferences of users, e.g. preferred topics of interest to various users. Data stored in user history area 2121 for a certain user can include, e.g. survey data, e.g. included within registration data obtained at a time of a registration of a user as a registered user of system 100. Data stored within user history area 2121 can also include, e.g. data mined from social media system 150 obtained based on permission received from a user. Data stored within user history area 2121 can also include, e.g. data mined from web browsing activity of a user. Data stored in user history area 2121 can also include data of prior presentation sessions mediated by manager system 110 in which a user was presented with image representations having representations of objects. The prior session feedback data obtained during a prior presentation session can include feedback data that specifies, e.g. identifiers of objects subject to an eye gaze of a user during a presentation session, facial expression identifiers associated to augmented objects of a prior session, and the like.

Data repository 108 in presentation sessions area 2122 can store data on current and past presentation sessions mediated and managed by manager system 110. Data of presentations area can include e.g. UUIDs assigned to presentation sessions, users, user devices, user systems, feedback data.

Data repository 108 in models area 2122 can store various predictive models for use by manager system 110 in predicting actions of users of system 100 in response to the user being presented with an augmented object within an image representation. Predictive models stored in models area 2122 can be trained by machine learning processes.

Manager system 110 can be configured to run various processes, such as object recognition process 112, object evaluation process 113, image augmentation process 114, environment detection process 115, and natural language processing (NLP) process 116.

Manager system 110 running object recognition process 112 can include manager system 110 recognizing objects within image representations. Various processes can be used for detecting objects within a frame of image data, such as approaches based on object models, recognition by parts, edge matching, appearance based processes, gray scale matching, and histograms of receptive field responses. In performing edge detection, manager system 110 can employ, e.g. Canny edge detection to find edges. Manager system 110 can detect for changes in lighting and color. Manager system 110 can perform detection of edges in an image and a template and can compare edges of images to edges of templates find a matching template within a template repository of data repository 108. Manager system 110 running object recognition process 112 can employ an object recognition service that can generate a list of objects within each frame of image data examined. Manager system 110 can examine still image representations provided by single frames of image data for presentment by image server system 140 on viewing device 120 or can examine moving video image representations having a succession of frames of image data for display on a display of viewing device 120. Manager system 110 running object recognition process 112 can generate, for each frame of image data examined, a list of identifiers for objects within a frame. The list for each object identified can specify a set of pixel locations, the set of pixel locations specifying locations within a frame of image data in which the specified object having an object identifier is represented.

Manager system 110 running object evaluation process 113 can evaluate objects included within a frame of image data to determine whether the objects should be subject to augmentation. According to one embodiment, manager system 110 can selectively augment the highest scoring object of an image representation. According to one embodiment, manager system 110 can selectively augment all objects of an image representation having score exceeding a threshold. According to one embodiment, manager system 110 can selectively augment the highest scoring object of an image representation out of a the set of objects having a score exceeding a threshold.

For evaluating whether an object is to be subject to augmentation, manager system 110 running object evaluation process 113 can employ a scoring formula. The scoring formula can score a predicted interest level of a user in relation to the object. The scoring formula can include a plurality of factors. The plurality of factors can include a session external data factor in dependence on user data that is independent of presentation session. The plurality of factors can include a session dependent factor in dependence on feedback data obtained during a presentation session (e.g. current and/or past). Manager system 110 running object evaluation process 113 can dynamically examine moving video frames of image data, so that an augmentation of an object within moving video image data can change through the course of presentment of moving video frames of image data. Changes in object augmentation can be in dependence on changes in live feedback data from one or more user during a current image presentment presentation session, in which image data is presented to a user on a viewing device such as viewing device 120.

Manager system 110 running image augmentation process 114 can augment one or more object representation within a presented frame of image data presented to a user. According to one embodiment, the image augmentation can include color popping. According to a color popping effect, a frame of image data can be presented in monochrome format, except for one or more selected area of a frame of image data which is presented in color format. The one or more selected area can be provided by pixel locations defining an object selected for image augmentation. Image augmentation can alternatively or additionally comprise, e.g. selective brightening of an image representation in a selected area defining an object representation, image enlarging, or image flashing. With image enlarging, an object represented in a frame of image data with a certain number of pixels within the frame of image data is instead represented with a larger number of pixel locations within the frame of image data. With image flashing, the presentment of a frame of image data is changed from frame set to frame set in a succession of frame sets so that a representation of an object changes in appearance between frame sets. Image augmentation can additionally, or alternatively, include the presentment of supplemental indicia in association with an object representation. For example, manager system 110 for digitally augmenting an object within a frame of image data can present within a frame of image data a pointer toward a selected object representation or can present a border around a selected object representation.

Manager system 110 running environment detection process 115 can detect an environment in which system 100 is operating. Embodiments herein recognize that viewing device 120 can be provided in a plurality of different candidate environments. For example, viewing device 120 can be provided within a venue, e.g. an auditorium, a classroom, in which a plurality of user are located and wherein the plurality of users commonly view a common image representation (still or moving) provided on viewing device 120 defining a single viewing device of presentation session. In another environment, e.g. as in a live television broadcast multiple users can be commonly viewing a common image representation (still or moving) provided on multiple ones of viewing devices 120 distributed across different venues. In another environment, image server system 140 can serve an image representation (still or moving) for viewing by a single viewing user who is viewing a viewing device 120 that defines a single viewing device of a presentation session. According to one embodiment, manager system 110 can be configured to detect an environment in which viewing device 120 is operating and can provide a classification of the viewing environment in dependence on the detection. Classifications can include, e.g. multiple user environment that specifies that an image representation displayed on one or more viewing device 120 is being viewed by multiple users simultaneously. According to another classification, manager system 110 can specify that an image representation displayed by viewing device 120 is being viewed by a single user. There can be provided subclassifications within the described classifications.

According to one embodiment, manager system 110 can be configured so that manager system 110 changes one or more attribute of object evaluation process 113 in dependence on an output of environment detection process 115. That is, manager system 110 can change a manner in which objects of an image representation are evaluated for augmentation in dependence on the environment in which viewing device 120 is being operated. In some cases, in an environment in which viewing device 120 is operating can dynamically change over time. For example, viewing device 120 can be operated in a venue in which viewing device 120 is initially being viewed by a single user who is a registered user. Over time, attributes of that same environment can change. For example, the venue can later become occupied by second, third, and Nth users, where the second, third, and Nth users define a combination of registered and unregistered (guest) users. Registered users herein having associated stored user data in data repository 108 can be regarded as recognized users. Unregistered users herein can be regarded as unrecognized users. According to one embodiment, manager system 110 can adjust weights of an object evaluation scoring formula in dependence on a percentage of viewing users viewing a presentation session who are unregistered users. Manager system 110 can be configured according to one embodiment so that where the percentage of unregistered users increases (i.e. where less is known about the viewing users), object augmentation can become more dependent on presenter activity and less dependent on viewing user activity.

Manager system 110 can run NLP process 116 to process data for preparation of records that are stored in data repository 108 and for other purposes. Manager system 110 can run NLP process 116 to process voice data e.g. of a presenter of a presentation session or a viewer user of a presentation session. For subjecting voice data to processing by NLP process, manager system 110 can first convert the voice to text by way of activation of a voice to text process. Manager system 110 can run NLP process 116 to process text data of viewer user of a presentation session. Manager system 110 can run a natural language processing (NLP) process 116 for determining one or more NLP output parameter of a message. NLP process 116 can include one or more of a topic classification process that determines topics of messages and output one or more topic NLP output parameter, a sentiment analysis process which determines sentiment parameter for a message, e.g. polar sentiment NLP output parameters, "negative," "positive," and/or non-polar NLP output sentiment parameters, e.g. "anger," "disgust," "fear," "joy," and/or "sadness" or other classification process for output of one or more other NLP output parameters e.g. one of more "social tendency" NLP output parameter or one or more "writing style" NLP output parameter. By running of NLP process 116 manager system 110 can perform a number of processes including one or more of (a) topic classification and output of one or more topic NLP output parameter for a received message (b) sentiment classification and output of one or more sentiment NLP output parameter for a received message or (c) other NLP classifications and output of one or more other NLP output parameter for the received message. Topic analysis for topic classification and output of NLP output parameters can include topic segmentation to identify several topics within a message. Topic analysis can apply a variety of technologies e.g. one or more of Hidden Markov model (HMM), artificial chains, passage similarities using word co-occurrence, topic modeling, or clustering. Sentiment analysis for sentiment classification and output of one or more sentiment NLP parameter can determine the attitude of a speaker or a writer with respect to some topic or the overall contextual polarity of a document. The attitude may be the author's judgment or evaluation, affective state (the emotional state of the author when writing), or the intended emotional communication (emotional effect the author wishes to have on the reader). In one embodiment sentiment analysis can classify the polarity of a given text as to whether an expressed opinion is positive, negative, or neutral. Advanced sentiment classification can classify beyond a polarity of a given text. Advanced sentiment classification can classify emotional states as sentiment classifications. Sentiment classifications can include the classification of "anger," "disgust," "fear," "joy," and "sadness." Manager system 110 running NLP process 116 can include manager system 110 returning NLP output parameters in addition to those specification topic and sentiment, e.g. can provide sentence segmentation tags, and part of speech tags. Manager system 110 can use sentence segmentation parameters to determine e.g. that an action topic and an entity topic are referenced in a common sentence for example. In some use cases, manager system 110 can return topics that encompass multiple objects. In some use cases, manager system 110 can return topics that resolve to a single object.

Figure 2:
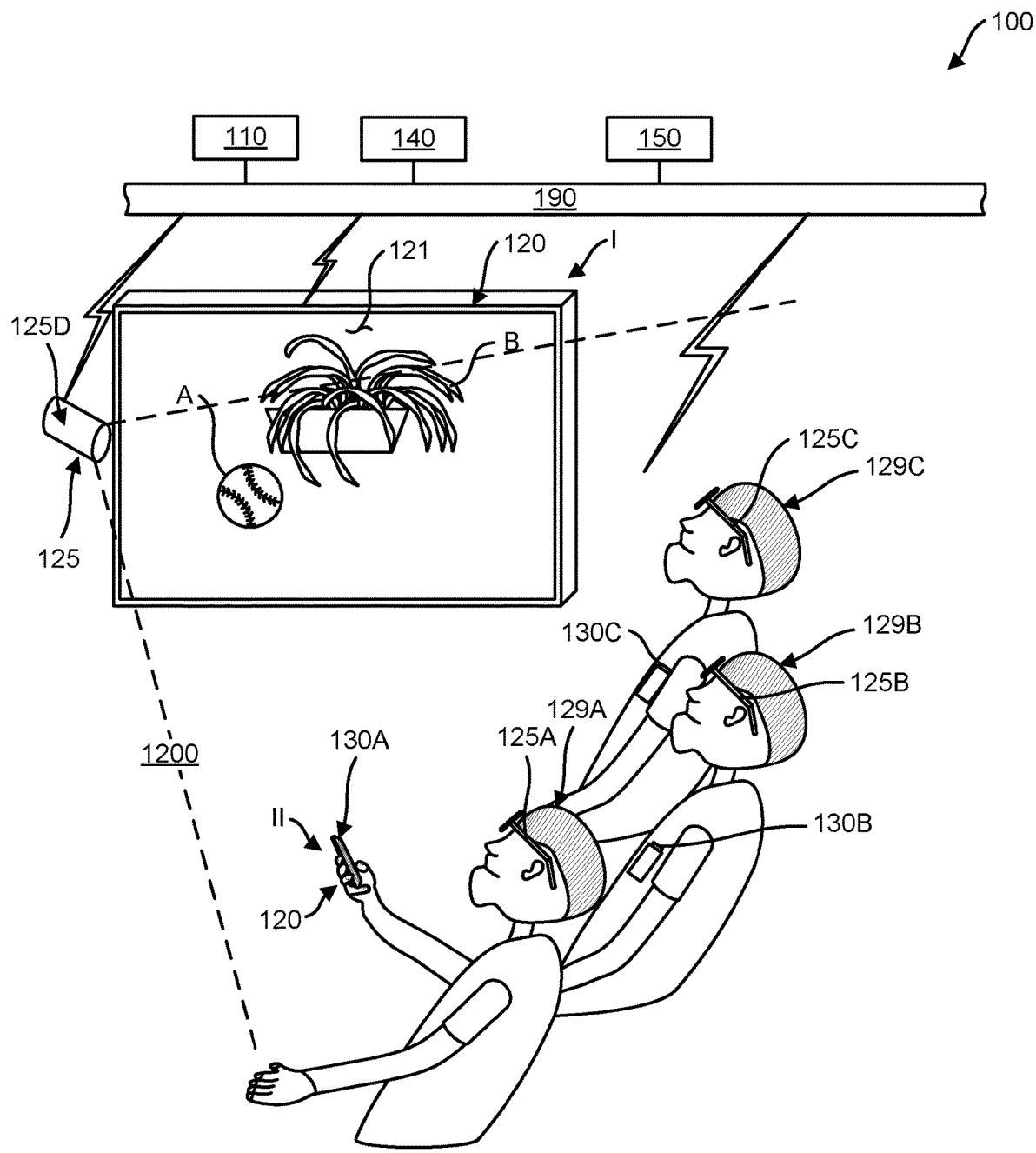
FIG. 2 depicts a partial physical form view of the system of FIG. 1 according to one embodiment.

A physical form view of system 100 according to one embodiment is illustrated in FIG. 2. In FIG. 2 there is depicted venue 1200 defining an environment having viewing device 120 at location I that includes a display displays and presents image representation 121. Image representation 121 can be still frame image representation having a single frame of image data or can be moving video image representation having a plurality of successive frames of image data of which one certain frame of image data is shown as being displayed. Image representation 121 can include various object representations including object representation A of a baseball and object image representation B of a plant. Within venue 1200 there can be included various users such as users 129A, 129B, and 129C each observing viewing device 120 at location I presenting image representation 122. Users 129A-129C can include respective associated client computer devices, such as client computer device 130A associated to user 129A, client computer device 130B associated to user 129B, and client computer device 130C associated to user 129C. Manager system 110 can be configured to recognize objects (object representations) within image representation 122 and can be further configured to evaluate recognized object representations, e.g. representations A and B for augmentation.

There can be disposed within venue 1200 sensor system 125 for sensing responses of viewing users of venue 1200 in response to being presented with image representation 121. Sensor system 125 can comprise multiple sensor devices distributed throughout venue 1200 and additional environments being supported by system 100. Sensor system 125 can include, e.g. eye tracking device 125A worn by user 129A, eye tracking device 125B worn by user 129B, and eye tracking device 125C worn by user 129C as well as video camera device 125D which can be, e.g. mounted on a wall in common with a wall that supports viewing device 120 at location I displaying image representation 121. Video camera device 125D can output image data representing a viewer user or users of system 100. Shown as being external to viewing device 120, video camera device 125D can additionally or alternatively be integrated into viewing device 120. Video camera device 125 can have a field of view encompassing viewer user of users of system 120.

Manager system 110 can support multiple classifications of viewing environments. Viewing environment 1200 as shown can comprise multiple users 129A-129C commonly observing viewing device 120 at location I that presents image representation 121. However, it will be understood that a user, e.g. user 129A can be the sole viewer of an image representation being presented on a display of client computer device 130A at location II associated to user 129A. In the described context where user 129A views content on a display of client computer device 130A, viewing device 120 can be regarded to be collocated with client computer device 130A. Thus, in FIG. 2, client computer device 130A at location II is also labeled with reference element number 120, indicating that client computer device 130A serves as a viewing device 120 provided by a personal viewing device in the described context. Where viewing device 120 is collocated with a client computer device such as client computer device 130A, video camera device 125D can be provided by an integrated built in camera of the client computer device such as client computer device 130A. In one multi-user operating environment a plurality of users can be commonly observing an image representation simultaneously being displayed on respective multiple different viewing devices collocated with client computer devices of the respective users distributed throughout a plurality of venues.

Figure 3:
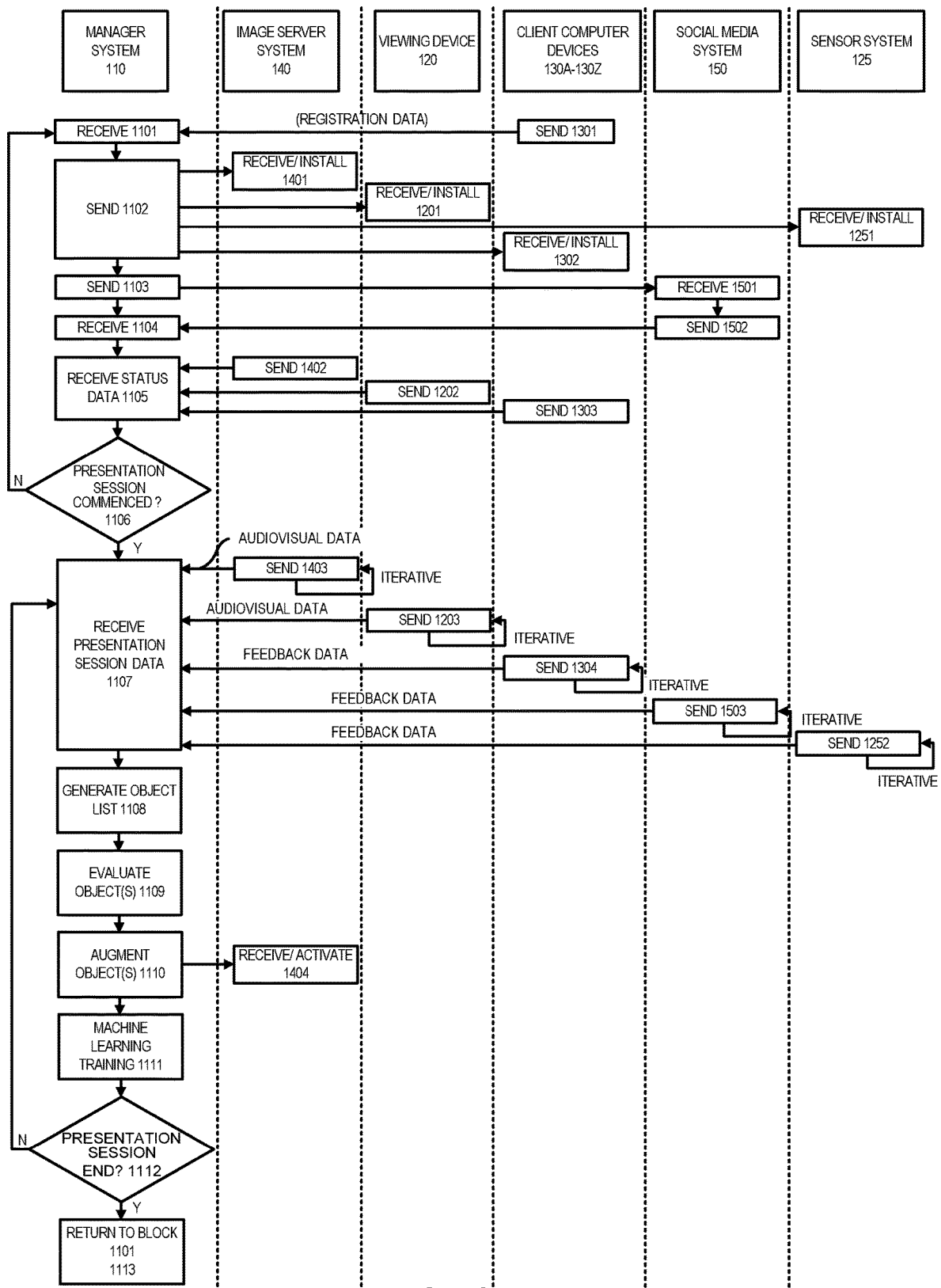
FIG. 3 is a flowchart illustrating a method for performance by a manager system interoperating with other components according to one embodiment.

FIG. 3 is a flowchart illustrating a method for performance by manager system 110 interoperating with image server system 140, viewing device 120, client computer devices 130A-130Z, social media system 150, and sensor system 125. At block 1101, manager system 110 can be receiving registration data from client computer devices 130A-130Z. Registration data can be entered into a user interface, examples of which are shown in FIGS. 4 and 5.

Figure 5:
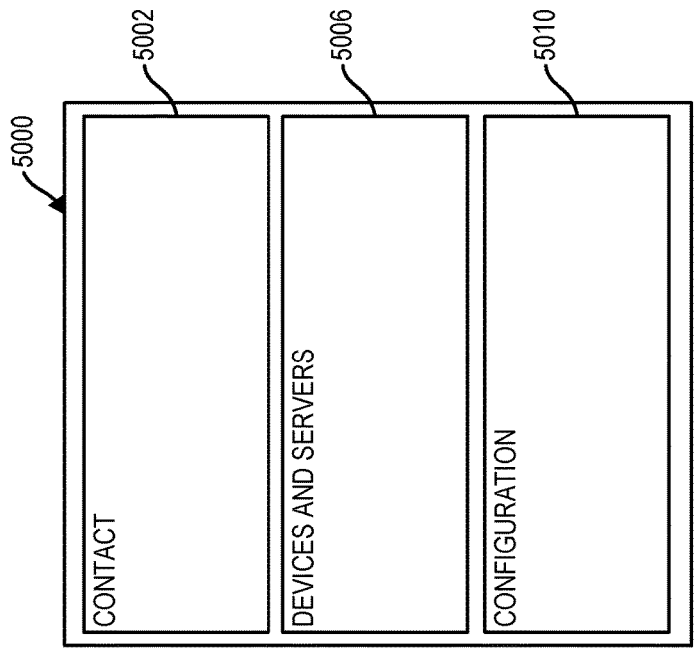
FIG. 5 depicts a displayed user interface for display on a display of an enterprise agent user interface according to one embodiment.

FIG. 5 is a user interface for use by a human customer user which can be regarded as a viewing user who views content presented with use of system 100. User interface 5000 as shown in FIG. 5, is a user interface for use by a human content provider enterprise agent user of an enterprise that provides content for presentment to viewing users of system 100.

Figure 4:
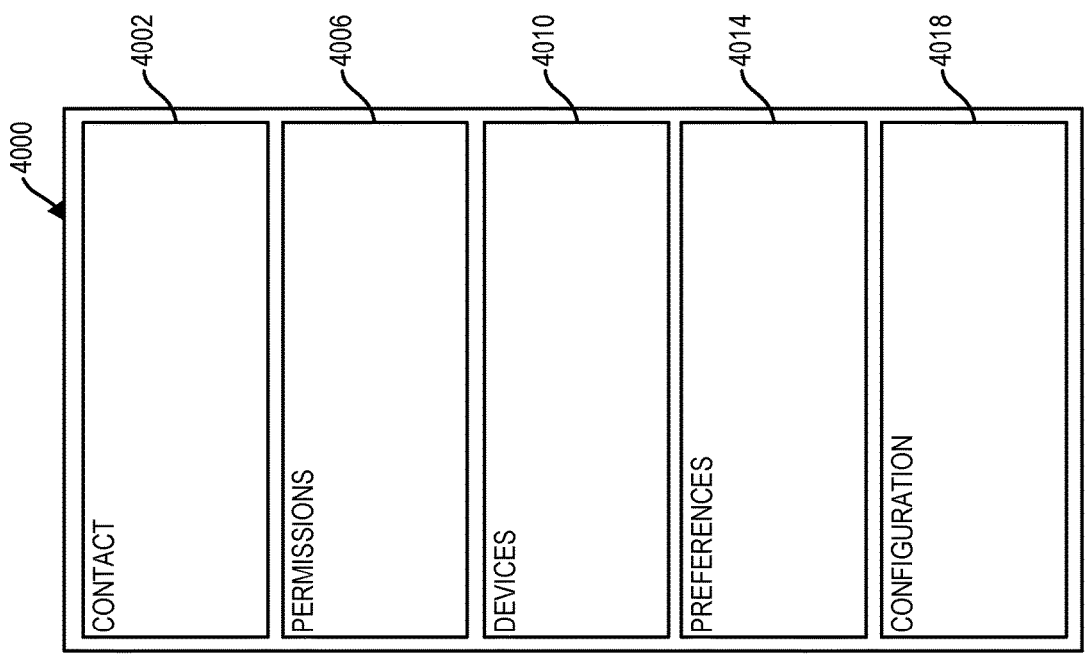
FIG. 4 depicts a displayed user interface for display on a display of a client computer device of a viewing user according to one embodiment.

Referring to user interface 4000 of FIG. 4, user interface 4000 can include contacts area 4002, permissions area 4006, devices area 4010, preferences area 4014, and configuration area 4018. User interface 4000 of FIG. 4 and user interface of FIG. 5 can be displayed on a display of a client computer device of client computer devices 130A-130Z. Some of client computer devices 130A-130Z can be customer (viewer) client computer devices and some of client computer devices 130A-130Z can be client computer devices associated to agent users, i.e. users who are agents of content provider enterprises that provide image data viewing content with use of system 100. In contacts area 4002, a viewing user can enter contact information, e.g. name, address, e-mail address, phone number, social media addresses, and the like. In permissions area 4006 a user can specify permissions that facilitate use by system 100 of personal data of a user. In permissions area 4006 a user can specify e.g. that manager system 110 is permitted to obtain social media data and/or web browsing data of a user. In devices area 4010, a viewing area can specify addresses, e.g. IP and MAC addresses of any devices, e.g. client computer devices of a user for use by system 100. In preferences area 4014, a user can specify preferences of a user, e.g. topic, likes, and dislikes of a user. In area 4014 a user can answer survey data presented by user interface 4000 that prompts a user to enter data specifying likes and dislikes of the user. In configuration area 4018, a user can enter configuration data that specifies one or more attribute of an image augmentation that is desired by a user.

Referring to user interface 5000 as shown in FIG. 5, an enterprise agent user in area 5002 can specify contact information for an image data content provider, e.g. enterprise name, address, contact information, website information, and the like. In area 5006, an enterprise agent user can specify information on devices and servers of an enterprise to be supported within system 100. Devices and server information specified within area 5006 can include, e.g. address information such as IP and MAC address information for devices that define viewing devices such as viewing device 120 and systems such as an image server systems defining an image server system 140 within system 100. In area 5010, an enterprise agent user using user interface 5000 can specify configuration data that defines registration data. In configuration area 5010 of user interface 5000 an enterprise agent user can specify conditions in which image augmentation functionalities set forth herein are to be activated, e.g. for specific files, environments, image server systems, times, and the like. The configuration data can specify one or more attribute of an image augmentation as set forth herein and can specify limits on configuration options that are selectable by a viewing user using area 4018 of user interface 4000.

On receipt of registration data received at block 1101, manager system 110 can proceed to block 1102. At block 1101, manager system 110 can send received registration data for receipt and storage by manager system 110 into user history area 2121. Within user history area 2121 manager system 110 can assign a Universally Unique Identifier (UUID) for each new user registered with system 100. Registered users of system 100 can include registered viewer users and registered content provider enterprise users. Manager system 110 can be configured to assign a new UUID for each recognized new user of system 100. On completion of block 1101 manager system 110 can proceed to block 1102.

At block 1102, manager system 110 can send installation packages for any newly registered servers and devices of system 100. At block 1102, manager system 110 can send an installation package to image server system 140, viewing device 120, and client computer devices 130A-130Z. The respective installation packages can be received and installed by image server system 140 at block 1101, by viewing device 120 at block 1201, and by client computer devices 130A-130Z at block 1302. An installation package received and installed at block 1401 can include, e.g. libraries and executable code to facilitate participation of image server system 140 in system 100. An installation package received at block 1201 by viewing device 120 can facilitate participation by viewing device 120 in system 100 and can include, e.g. libraries and executable code. An installation package received at block 1302 can include, e.g. libraries and executable code to facilitate participation of client computer devices 130A-130Z in system 100. At block 1102, manager system 110 can further send an installation package for receipt and installation by devices of sensor system 125 at block 1251. Received installation packages received and installed at block 1251 can include, e.g. libraries and executable code facilitating participation of a sensor device in system 100.

Referring again to user interfaces 4000 and 5000, a user can specify information of sensor devices defining sensor system 125 using devices area 4010 of user interface 4000 and/or devices and servers area 5006 of user interface 5000 (in the case of an agent user). On completion of block 1102, manager system 110 can proceed to block 1103.

At block 1103, manager system 110 can send query data for receipt by social media system 150 at block 1501. In response to the received query data received at block 1501, social media system 150 can send, at block 1502, response data for receipt by manager system 110 at block 1104. The response data can include, e.g. posts data entered by registered users into social media system 150. On receipt of the posts data, manager system 110 can store the posts data into user history area 2121 of data repository 108. Manager system 110 on receipt of the response data at block 1104 can subject posts data to processing by NLP process 116 to extract topic tags associated to the posts data as well as sentiment tags to discern based on the posts data topic likes and dislikes of a user. Manager system 110 on receipt of such posts data can activate NLP process 116 to extract topic and sentiment parameters that specify positive and negative topic preferences of a user for storage into user history area 2121 of data repository 108. Manager system 110 can store data of topic likes and dislikes of a user in user history area 2121 based on processing of posts data. On completion of block 1104, manager system 110 can proceed to block 1105. In some scenarios, a topic extracted manager system 110 can be a general topic that encompasses a plurality of object. In some scenarios, a topic extracted manager system 110 can be a topic that maps to an object identifier.

At block 1105, manager system 110 can receive status data from image server system 140 which can be sending status data at block 1402, viewing device 120 which can be sending status data at block 1202, and client computer devices 130A-130Z which can be sending status data at block 1303. With the status data sent by client computer devices 130A-130Z at block 1303, client computer devices 130A-130Z can be sending e.g. text and image data returned from online browsing activities of a user. Manager system 110 on receipt of such text and image data returned from online browsing activities can activate NLP process 116 to extract topic and sentiment parameters that specify positive and negative topic preferences of a user for storage into user history area 2121 of data repository 108.

In response to the receipt of status data at block 1105, manager system 110 can examine the received status data and at block 1106 can be iteratively determining whether a presentation session has commenced. If commencement of a presentation session has not been detected, manager system 110 can return to block 1101 and can iteratively perform the loop of blocks 1101-1106 until a presentation session had commenced. On the detection that a presentation session has commenced, manager system 110 can proceed to block 1107.

With the detection of commencement of a presentation session, manager system 110 can record in data repository 108 in presentations sessions area 2122, commencement times of commenced sessions and also participating devices and systems defining a presentation session, including identifiers for an image server system 140 of a session, a viewing device 120 of a session, and one or more viewing users and associated client computer devices associated to a session. Manager system 110 in presentation sessions area 2122 can maintain a log of current and historical participants of a presentation session.

At block 1107, manager system 110 can be receiving presentation session data. The presentation session data can be data of a current presentation session. The presentation data can include audiovisual data from image server system 140 and/or viewing device 120 image data defining a current presentation session, e.g. including an image representation provided by a still image representation or a moving video image representation comprising a plurality of successive frames of image data, as well as audio data including audio data representing speech of a presenter associated to the image representation. The received presentation session data can also include from client computer devices 130A-130Z, social media system 150, and sensor system 125 feedback data. Feedback data received from client computer devices 130A-130Z during a session can include, e.g. voice data entered into an audio input device of a client computer device by a user and/or text data input by a user during a presentation session commenting on the presentation session. Feedback data sent at block 1304, from client computer devices 130A-130Z can also include, e.g. location data output by a GPS device of a client computer device specifying the current location of a client computer device. Accordingly, manager system 110 can ascertain, e.g. whether a user has exited a venue or has entered a venue in which a presentation session is occurring. Received presentation session data received at block 1107 can further include updated social media data as received from social media system 150 at block 1104, updated user web browsing data as received from client computer devices at block 1105 and updated status data as received from image server system 140, viewing device 120 and client computer devices 130A-130Z at block 1105. Image server system 140 can be sending presentation session data at block 1403, viewing device 120 can be sending presentation session data at block 1203, client computer devices 130A-130Z at block 1304, social media system 150 can be sending presentation session data at block 1503, and sensor system 125 can be sensing presentation session data at block 1252.

Feedback data sent by social media system 150 can include, e.g. posts data by a user commenting on presented image data during a presentation session in which image data is being presented. Feedback data send by social media system 150 at block 1503 can include, e.g. posts data defining comments by users in response to viewing image data of a presentation session. Feedback data sent by sensor system 125 at block 1252 can include various data, such as eye tracking data provided by eye tracking devices, e.g. eye tracking devices 125A-125C, which can be worn respectively by a plurality of users such as users 129A-129C as shown in FIG. 2.

Eye tracking data can indicate a current gaze location of a user on a currently presented frame of image data. Manager system 110 can examine eye tracking feedback data in comparison to data of an object representation list to return an identifier of an object that occupies the current gaze of a user. Feedback data sent by sensor system 125 at block 1252 can also include camera image data provided by video camera device such as video camera device 125D shown in FIG. 2.

Manager system 110, at block 1105, in response to the received image data and received feedback data received at block 1107 can store received image data and received feedback data into presentation sessions area 2122 of data repository 108. User specific session data can be stored in duplicate in user history area 2121 of data repository 108. On completion of block 1107, manager system 110 can proceed to block 1108.

At block 1108, manager system 110 can generate an object list for a current frame of image data defined by image data received at blocks 1403 and/or block 1203. At block 1108, manager system 110 can activate object recognition process 112 as described in connection with FIG. 1. An object list for a certain frame of image data can specify a list of objects represented in and simultaneously presented by display of the certain frame.

Various processes can be used for detecting objects within a frame of image data, such as approaches based on object models, recognition by parts, edge matching, appearance based processes, gray scale matching, and histograms of receptive field responses. In performing edge detection, manager system 110 can employ, e.g. Canny edge detection to find edges. Manager system 110 can detect for changes in lighting and color. Manager system 110 can perform detection of edges in an image and a template and can compare edges of images to edges of templates find a matching template within a template repository of data repository 108. Manager system 110 running object recognition process 112 can employ an object recognition service that can generate a list of objects within each frame of image data examined. Manager system 110 can examine still image representations provided by single frames of image data for presentment by image server system 140 on viewing device 120 or can examine moving video image representations having a succession of frames of image data for display on a display of viewing device 120. Manager system 110 running object recognition process 112 can generate, for each frame of image data examined, a list of identifiers for objects within a frame. The list for each object identified can specify a set of pixel locations, the set of pixel locations specifying locations within a frame of image data in which the specified object having an object identifier is represented.

Figure 6A:
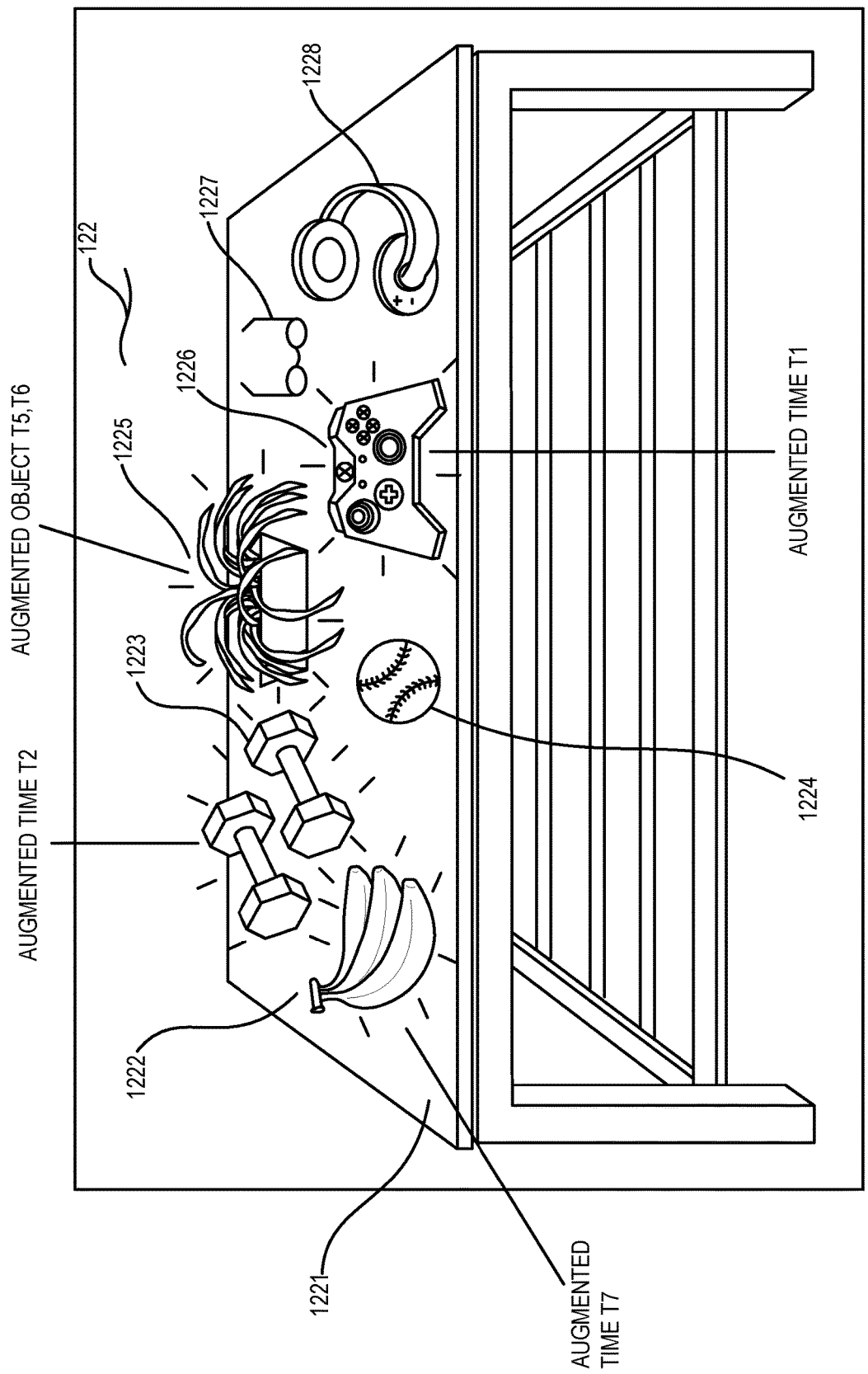
FIG. 6A depicts an image representation for presentment on a viewing device according to one embodiment.

Manager system 110 generating an object list is described further in reference to FIG. 6A illustration an example of an image representation 122 that can be displayed by a viewing device 120 of system 100. Based on performing of object recognition, manager system 110 can determine that a certain frame of image data of image representation 122 includes various representations of objects including representations of table object 1221, bananas object 1222, dumbbells object 1223, baseball object 1224, plant object 1225, game controller object 1226, eyeglasses object 1227, and headphones object 1228. Based on the recognition of the described objects, manager system 110 can generate and object list as set forth herein below in Table A.

TABLE A

| Object | Pixel Locations |
| --- | --- |
| Table | XX |
| Bananas | XX |
| Dumbbells | XX |
| Baseball | XX |
| Plant | XX |
| Game Controller | XX |
| Eyeglasses | XX |
| Headphones | XX |

For each object there can be provided on the object list of Table A, an identifier, e.g. a text based identifier for the object as well as text based data specifying pixel locations for each object of the object list. A returned object list herein as shown in FIG. 1 according to one embodiment can define a list of object identifiers (left column), wherein the object identifier identify object representations in an image representation as well as the underlying objects represented by the object representations. On completion of generating an object list at block 1108, manager system 110 can proceed to block 1109.

At block 1109, manager system 110 can perform evaluation of objects referenced in the generated object list. Manager system 110 at block 1109 can activate object evaluation process 113 as described in FIG. 1. Manager system 110 performing block 1109 to evaluate objects can include manager system 110 using the multifactor function as set forth in Eq. 1.

$$S=F_1W_1+F_2W_2+F_3W_3 \tag{Eq. 1}$$

Where $F_1$ is a first factor, $F_2$ is a second factor, and $F_3$ is a third factor, where $W_1$, $W_2$, and $W_3$ are weights associated with each of the respective factors $F_1$-$F_3$, and where S of Eq. 1 is a score indicating a predicted interest level of one or more user to the object. One or more user can be an individual user or the one or more user can be an aggregation of users. According to Eq. 1, $F_1$ can be a session external factor. Data used for determination of values under factor $F_1$ can include data of user history area 2121 other than presentation session data. Such data can include survey data, e.g. as collected within registration data received at block 1101, social media preference data, e.g. data extracted by examination of posts data of users to determine topic interests of users, and/or browsing history data, e.g. data extracted by examination of browsing history data of users to determine topic interests of users. Referring further to Eq. 1, factor $F_2$ can be a session factor. Data used for determination of values under factor $F_2$ can include, e.g. feedback data of a presentation session, and/or feedback data of prior one or more presentation session participated in by one or more user. Referring further to Eq. 1, factor $F_3$ can be a presenter factor. Embodiments herein recognize that displayed and presented image data, such as image data of frame of image data 122 as shown in FIG. 6A can have an associated presenter that can be provided by an announcer or narrator. Referring to factor $F_3$, manager system 110 can assign higher values under factor $F_3$ where a presenter associated with image representation is currently talking about the represented object and can assign lower values under factor $F_3$ where a presenter associated with image data is not currently talking about the represented object. According to one example, a current topic of speech of a presenter can be "gardening". In such a scenario, when manager system 110 evaluates plant object 1225 (FIG. 6A) for augmentation, manager system 110 can apply a relatively high value under factor $F_3$, but when game controller object 1226 (having nothing to do with gardening) is being evaluated for augmentation, can assign a relative low value under factor $F_3$.

Received data, received at block 1107, can include received audiovisual data received from image server system 140 and/or viewing device 120. The audio portion of such audiovisual data can be processed by manager system 110 on its receipt to extract a topic associated to voice data of a presenter associated to presented image data.

According to one embodiment, manager system 110 can assign higher values under factors $F_1$ where session external data of one or more user indicates that the one or more user has a positive preference for the object of the object list and can assign lower values under factor $F_1$ where session external data of the one or more user indicates that the one or more user has a negative preference for the object of the object list. Session external data can include, e.g. registration data of a user and social media extracted data of the user, and/or browsing history extracted data of a user. According to one embodiment, for assign data values under factor $F_1$ manager system 110 can apply Eq. 2 as set forth herein.

$$V_{F1}=EF_1W_1+E_{F2}W_2+E_{F3}W_3 \tag{Eq. 2}$$

Where $V_{F1}$ is a data value for factor $F_1$ of Eq. 1, $E_{F1}$ is a first session external factor, $E_{F2}$ is a second session external factor, $E_{F3}$ is a third session external factor, and $W_1$-$W_3$ are weights associated to the respective factors $E_{F1}$, $E_{F2}$ and $E_{F3}$. Referring to Eq. 2, $E_{F1}$ can be a registration data factor and $E_{F2}$ can be a social media data factor, i.e. preference data of a user as determined by subjecting social media posts of one or more user to NLP processing by activation of NLP process 116 to determine a topic and a sentiment associated to posts data of one or more user. $E_{F3}$ can be a browsing activity factor, i.e. preference data of a user as determined by subjecting browsing data content returned by browsing data of one or more user to NLP processing by activation of NLP process 116 to determine a topic and a sentiment associated to web browsing activity of one or more user. Web browsing activity can include e.g. articles searches of a user, online purchases of the user, online photograph searches of a user, and online shopping activity of a user.

For providing values under factor $F_2$ of Eq. 1, manager system 110 can use Eq. 3 as set forth below.

$$V_{F2}=PF_1W_1+P_{F2}W_2+P_{F3}W_3+P_{F4}W_4 \tag{Eq. 3}$$

Where $V_{F2}$ is a data value to be assigned under factor $F_2$ of Eq. 1, where $P_{F1}$ is a gaze factor, $P_{F2}$ is a facial expression factor, $P_{F3}$ is a comments factor, and $P_{F4}$ is a trained model query factor, and where $W_1$-$W_4$ are weights associated to the respective factors $P_{F1}$-$P_{F4}$.

Referring to the flowchart of FIG. 3, received data received by manager system 110 at blocks 1105 and 1107 can be tagged with identifiers, e.g. IP addresses and/or MAC addresses of devices or systems sending the received data, so that by examination of the received data, manager system 110 can determine attributes of an environment associated to a presentation session. Manager system 110, for example, can determine whether a viewing device in which presentation content is being presented is a personal device such as a client computer device or alternatively, other viewing device 120 is in a publicly accessible venue simultaneously viewed my multiple users, or whether an image representation is being simultaneously viewed by multiple different viewing users at different locations. Manager system 110 can examine feedback data provided by location data sent by client computer devices to ascertain a current location of all users of system 100 at any given time, and therefore can determine a full set of users located at any given venue being managed with use of system 100 at any given time.

Referring to Eq. 3, $V_{F2}$ can be a value for application under factor $F_2$ of Eq. 1, which is a session factor indicative of a level of interest of one or more user in an object representation being evaluated based on presentation session data. Manager system 110, as set forth herein, can ascertain a current gaze location of a user in dependence on an output of an eye tracking device being worn by a user, such as eye tracking devices 125A-125C as shown in FIG. 2. Manager system 110 can assign a higher value under factor $P_{F1}$ if the current gaze of the user is associated to the object being evaluated and can assign a lower value where a current gaze of the user is not associated to the object being evaluated. Manager system 110 can assign values under factor $P_{F1}$ in dependence on a strength of a gaze. Gaze strength can be determined, e.g. on duration and/or centeredness (how centered the gaze is in relation to an object).

With further reference to Eq. 3, factor $P_{F2}$ can be a facial expression factor. Manager system 110 determining a facial expression can include manager system 110 processing received camera video data received from a monitoring camera device such as video camera device 125D as shown in FIG. 2. Manager system 110 can be configured to activate NLP process 116 (FIG. 1) to process received image data received from a monitoring camera device such as monitoring video camera device 125D. Based on the processing of such camera video data, manager system 110 can return facial expression parameter values for users within a venue such as users 129A-129C, as shown in venue 1200 of FIG. 2. According to one embodiment, manager system 110 can assign positive or negative sentiment parameter values to a current facial expression of a user represented in received camera monitoring video data.

According to factor $P_{F2}$ of Eq. 3, manager system 110 can assign a higher value under factor $P_{F2}$ where in a current presentation session, a user has exhibited a positive facial expression sentiment to the current object being evaluated when the current object being evaluated has been augmented in a current presentation session and can assign a lower value under factor $P_{F2}$ when during a current presentation session the user has exhibited a negative sentiment to the current object being evaluated when the current object being evaluated has been augmented during a current presentation session.

Still referring to Eq. 3, factor $P_{F3}$ is a comments factor. Regarding factor $P_{F3}$, manager system 110 can be configured to process voice data and/or entered text data entered by a user during a current presentation session. Such user voice data can be captured with use of an audio input device of a client computer device of a user during a current presentation session. Such text data of a user can be captured by examination, e.g. a virtual keypad input data of a user during a current presentation session and/or by examining of posts data posted onto social media system 150 by a user during a current presentation session. As set forth herein, manager system 110 can be configured to process entered voice and/or text data for processing of received voice and/or text data received from a user during a current presentation session, manager system 110 can activate NLP process 116 to return sentiment parameter values associated to the received voice and/or text data of a user received during a current presentation session. Manager system 110 can be configured to assign positive sentiment parameter values or negative sentiment parameter values for a user associated to a currently augmented object augmented within a display of a current presentation session. Manager system 110 can assign a higher value under factor $P_{F3}$ where during a current presentation session a user has exhibited a positive comment (i.e. verbal or text) session when an object being evaluated has been subject to augmentation during a current presentation session and can assign a lower value under factor $P_{F3}$ when during a current presentation session a user has exhibited a negative comment session when the object being evaluated has been subject to augmentation during a current presentation session.

With further reference to Eq. 3, $P_{F4}$ is a trained model factor. Manager system 110 can be configured so that a value assigned under factor $P_{F4}$ of Eq. 3 is in dependence on a result of querying a trained predictive model that is trained using machine learning processes.

FIG. 8 illustrates a predictive model trained by a machine learning process. Predictive model 8002 can be trained with presentation session data to predict a user's response to a certain object within an image representation being augmented, e.g. with a color pop and/or with another augmentation. Training data used for training, predictive model 8002 can include current session training data and/or historical presentation session training data. Predictive model 8002 can be trained with multiple iterations of training data. Predictive model 8002 can be trained with use of supervised learning machine learning processes. According to one embodiment, each iteration of training data for training predictive model 8002 can be associated with one augmentation event in which an object within a presented image representation is augmented. For each augmentation event there can be applied, as training data, (a) an object identifier for the object that has been augmented; (b) a topic identifier for the object that has been augmented; and (c) response data that specifies a response of a user in response to being presented with an image representation including the object augmentation. According to one embodiment the response data can include a qualitative value, e.g. on a scale of 0.0-1.0, wherein a score trending toward 0.0 indicates that the user did not focus his/her gaze on the augmented object in response to the augmentation being presented and scoring values trending towards 1.0 indicating that the user did in fact focus his/her gaze on the augmented object in response to the augmentation being presented.

According to one embodiment, augmentation events from all presentation sessions participated in by a user can be used for training predictive model 8002. Manager system 110 can instantiate an instance of predictive model 8002 for each user of system 100. With use of the described training data, predictive model 8002 can be trained to predict a user's response to being presented with an image representation having a certain object (the object having a certain topic) being augmented by an augmentation process herein, e.g. color popping and/or another augmentation process. Predictive model 8002, once trained with use of the described training data can be configured to respond to query data.

Query data that can be applied to predictive model 8002 can include, e.g. data that comprises an object identifier for an object and/or a topic identifier for a topic. The described object and/or topic identifiers can be identifiers for the current object being evaluated using Eq. 3. Predictive model 8002, once trained by the described supervised machine learning processes, can be configured to respond to such described query data. Predictive model 8002 in response to being queried with the described query data can return response data that comprises a predictive response of the user in response to augmentation of the object being evaluated using Eq. 3. The predicted response data can be, e.g. a return qualitative value indicating a likelihood of the user gazing at the object being evaluated in response to augmentation of the object being evaluated, e.g. on a scale of 0.0 (indicating no likelihood) to 1.0 (indicating certainty that the user will gaze at the object the object if augmented).

Referring to Eq. 1, factor $F_3$ can be a presenter factor which is in dependence on a current topic of speech of a presenter associated to presented image data. Manager system 110 can be configured so that manager system 110 examines voice data of a presenter associated to presented image data, examination of received presenter voice data received by manager system 110 can include activation of NLP process 116 to return a topic classifier associated to the received voice data. Manager system 110 can be configured to assign a higher value under factor $F_3$ where an object being evaluated for augmentation has a topic matching a current topic of a presenter's speech and can assign a lower value under factor $F_3$ where a topic of the object being evaluated for augmentation is mismatched with respect to a current topic of a presenter's speech, where the presenter is the presenter associated with presented image data being presented by viewing device 120.

According to one embodiment, manager system 110 can be configured to dynamically adjust a current object augmentation within an image representation in response to live feedback data of a current presentation session. One use case is described with reference to Table B which illustrates application of Eq. 1 to select for augmentation one or more object representation of an image representation. For a certain image data frame being evaluated, the object scores specified in Table B can be returned in one hypothetical example.

TABLE B

| Object | Eq. 1 - S Score |
|---|---|
| Table | 0.11 |
| Bananas | 0.07 |
| Dumbbells | 0.05 |
| Baseball | 0.12 |
| Plant | 0.62 |
| Game Controller | 0.65 |
| Eyeglasses | 0.03 |
| Headphones | 0.35 |

In the hypothetical example of Table B, user A can be a devoted video gamer having non-session historical data that specifies that user A has a positive preference for video gaming. On being presented with image representation 122 as shown in FIG. 6A, user A (based on user A's interest in video gaming) can be exhibiting a pronounced eye gaze centered on game controller object 1226. However, a presenter associated with a presentation of image representation 122 can be currently speaking on the topic of "gardening". Accordingly, under the scenario described S scores, as referenced in Table B, might be returned. Referring to Table B, the highest returned S scores are the S scores for plant at 0.62 and game controller 0.65 (scoring can be provided according to one example on a 0.0-1.0 scale). In the described example, manager system 110 can select the game controller object represented in image representation 122 based on the game controller object as summarized in Table B returning the highest score. According to a current configuration of system 100, only one object is augmented at a given time (according to another configuration, both the game controller and plant objects can be selected for augmentation simultaneously, based on their respective S scores each exceeding a threshold, e.g. 0.60).

However, with further reference to the example of Table B, consider the further scenario where user A becomes significantly interested in the voice content of the presenter associated with image representation 122 and because of the interest level, user A's gaze may shift to be a gaze centered on plant object 1225, rather than game controller object 1226. In such a scenario, with further reference to Table B, when image representation 122 (which comprises a plurality of successively displayed frames of image data in the case of a moving video image representation) the scoring summarized in Table B can change in accordance with application of Eq. 1 so that the score associated to the game controller object becomes lower (because user A's gaze has shifted) and the S score for the plant object increases (because user A's gaze has shifted to be centered on the plant object). In the described scenario, when image representation 122 is reevaluated at a later time during a single presentation session, manager system 110 can dynamically change the currently selected augmented object of image representation 122 to be the plant object 1225 rather than the game controller object 1226 selected previously for augmentation. In the described scenario, manager system 110 is configured to adapt the functioning of viewing device 120 defining a user interface so that viewing device 120 optimally performs in response to sensed conditions and dynamically changes its function over time so that its function continues to optimally engage a user as conditions change.

In further reference to Table B, it can be seen that an object selected for augmentation can be in dependence on a current topic of speech of a presenter, the current gaze of a user can change dynamically as a gaze of a user and other feedback data of a user changes over time.

According to one embodiment, manager system 110 can be configured so that performance of Eq. 1 for scoring of objects for evaluation dynamically changes in dependence on attributes of an environment in which an image representation is being presented.

Referring now to Table C, an example is described wherein augmentation of an object within an image representation can dynamically change in dependence on attributes of an environment in which image data of a presentation session is being presented.

TABLE C

| Time | Viewing Users in Venue defining environment | Presenter Activity | Description of Scoring Function S | Result |
|---|---|---|---|---|
| T1 | 129A(R) | Not Talking | S can be dependent on Factor $F_1$ and $F_2$ based on User 129A data | Gaming Controller Object is augmented |
| T2 | 129B(R) | Not Talking | S can be dependent on Factor $F_1$ and $F_2$ based on User 129B data | Dumbbells Object is augmented |
| T3 | 129B(R) | Talking (gardening) | S can be dependent on Factor $F_1$ and $F_2$ based on User 129B data and on Factor $F_3$ | Dumbbells or Plant Object is augmented |
| T4 | 129B(R), 129A(R), 129C(R) | Talking (gardening) | S can be dependent on Factor $F_1$ and $F_2$ based on aggregated User 129A, 129B, and 129C data and on Factor $F_3$ | Plant Object or New Object is augmented |
| T5 | 129B(R), 129A(R), 129C(R), 129D(NR), 129E(NR), 129F(NR), 129G(NR) | Talking (gardening) | S can be dependent on Factor $F_1$ and $F_2$ based on User 129A, 129B, and 129C data and on Factor $F_3$, or can be dependent of Factor $F_3$ only if threshold exceeded | Plant Object is augmented |
| T6 | 129D(NR) | Talking (gardening) | S can be dependent on Factor $F_3$ only | Plant Object is augmented |
| T7 | 129D(NR) | Talking (edible fruits) | S can be dependent on Factor $F_3$ only | Bananas Object is augmented |

Referring now to Table C, Table C describes changing attributes of an environment such as an environment in accordance with FIG. 2 over time and the impact of such changing attributes on objects that can be augmented within an image representation. The Table C data considers the scenario wherein an environment is in accordance with the venue 1200 of FIG. 2, and where an image representation is being presented on viewing device 120 at location I. Table C illustrates a use case of how Eq. 1 can be applied to perform scoring of objects for evaluation for augmentation in dependence on changing environmental attributes. Table C describes a scenario in which manager system 110 detects a number of current simultaneous viewers of an image representation using sensor data from sensor system 125 and GPS feedback data from client computer devices 130A-130C. It will be understood that manager system 110 can alternatively for certain environments be detecting a number of current simultaneous viewing users by examining status data received at block 1105 and block 1107 which status data can specify participating devices and systems and identifiers for image representations being presented.

Referring to the flowchart of FIG. 3, it can be seen that manager system 110 can iteratively be performing evaluate objects block 1109 over time until a presentation session has ended. Referring to Table C, at time T1 only viewing user 129A can be within venue 1200. Manager system 110, in Table C, users are designated with a "(R)" where the user is a registered user and in Table C, users who are not registered users are designated with the designator "(NR)". Manager system 110 at block 1107 can be configured to detect the presence of both registered and unregistered user within an environment using received data, e.g. can use received location data of users to ascertain that the users are in venue 1200 where the users are registered users and in the case of unregistered users can use video monitoring data received from video camera device 125D to ascertain a count of unregistered users within venue 1200 defining an environment that can transition from a single user to a multiple user environment. Referring to Table C at time T1, user 129A who can be a registered user can be the only user within venue 1200 and a presenter associated with image representation 122 (FIG. 6A) can have a current status of "not talking". In such a scenario, the S score for each object being evaluated can be dependence on factors $F_1$ and $F_2$ of Eq. 1 based on 129A data. In the described scenario, user 129A can have non-presentation session data (Factor $F_1$ of Eq. 1) indicating a positive preference for video gaming and can be exhibiting a pronounced gaze centered on game controller object 1226. In such a scenario, as described in connection with Time T1 of Table C, game controller object 1226 can be augmented at time T1.

With further reference to Table C, at subsequent time T2 user 129A can have exited venue 1200 and user 129B can have entered venue 1200, and at time T2 the presenter activity status remains "not talking". Time T2, manager system 110 applying Eq. 1 can return S scores for each evaluated object of image representation 122 in dependence on factors $F_1$ and $F_2$ based on user 129B data. In the described scenario for time T2 subsequent to time T1 (T1-T7 are times in subsequent order to one another) user 129B can have a strong non session data indicating that user 129B has a strong interest in exercising and at time T2 user 129B can be exhibiting a gaze pattern wherein user 129B is exhibiting a strong gaze centered on dumbbells object 1223 of image representation 122. In such a scenario as described in connection with Time T2, the augmented object of image representation 122 can transition to dumbbells object 1223.

Referring to Time T3 of Table C, only user 129B can remain in venue 1200 and a presenter associated with image representation 122 can commence talking. The talking at Time T3 can be talking in respect to the topic of "gardening". In such a scenario, as is described in connection with Time T3, manager system 110 evaluating object representations for augmentation using Eq. 1 can apply presenter factor $F_3$. Manager system 110 using Eq. 1 for evaluating object representation for augmentation can apply Eq. 1 using factors $F_1$ and $F_2$ based on user 129B data and on factor $F_3$ (presenter factor) of Eq. 1. At Time T3, an object for augmentation can include according to one example, either dumbbells object 1223 or plant object 1225 in dependence on the values associated with factors $F_1$-$F_3$. However, it is noted as described in connection with Example 1 that if user 129B's gaze shifts to plant object 1225, scoring of Eq. 1 is likely to return a selection of plant object 1225 for augmentation.

At Time T4, user 129A can have returned to venue 1200 and can be joined by user 129C. All of users 129A-129C can be registered users. User 129A can have returned to venue 1200 with an exhibited historical non-session interest in "gaming" and can return to a gaze pattern with a gaze focused on game controller object 1226. In the described scenario of Time T4, user 129C, who just joined venue 1200 can be an audio file having an exhibited non-session positive preference for audio equipment and when entering venue 1200 can exhibit a pronounced gaze pattern centered on headphones 1228. In the described scenario of Time T4, manager system 110 applying Eq. 1 for evaluating objects for augmentation apply factor $F_3$ and can also apply factors $F_1$ and $F_2$ based on aggregated data of users 129A, 129B, and 129C. For example, at Time T4, manager system 110 applying Eq. 1 can use Eqs. 2 and 3 to return $V_{F1}$ and $V_{F2}$ values for each of the users within venue 1200 who are viewing image representation 122 including users 129A-129C and can aggregate the returned data values of $V_{F1}$ and $V_{F2}$ for each of the three users. For aggregating the values, manager system 110, e.g. can average the values or can aggregate the values in another way, e.g. using a weighted average or a filtered average in which select data values are discarded based on a criterion being satisfied.

At Time T5, referring further to Table C, users 129A-129C can be joined at venue 1200 by users 129D-129G who may be unregistered users. The unregistered users can be recognized as guest or anonymous users by manager system 110. In the described scenario of Time T5, it is seen that unregistered users outnumber registered users. In the described scenario of Time T5, manager system 110 using Eq. 1 can apply factors $F_1$-$F_3$ and for factors $F_1$ and $F_2$ can aggregate return data values using Eqs. 2 and 3 based on aggregated data of the registered users 129A-129C. At Time T5, based on recognition of an increase in a number of unregistered users, manager system 110 can according to one embodiment, adjust weights associated to the various factors of Eq. 1. According to Eq. 1, the weight $W_3$ of Eq. 1 can be in dependence on a proportion of unregistered users at a venue 1200 defining an environment in which presented image data is being presented. Manager system 110 can increase weight $W_3$ to be proportional to a percentage of unregistered users within venue 1200 so that the weight $W_3$ increases as the percentage of unregistered users increases. In such an embodiment, an augmented object of an image representation can be likely to be driven by a topic of a presenter rather than and idiosyncratic preference of one user or proportion of users. However, as a percentage of registered users within an environment increases, manager system 110 can adjust the weights associated with Eq. 1 so that preferences of users are considered more prominently.

With further reference to Time T4, it is described that historical non-session preferences and gazes of users 129A-129C can be diverse (user 129A can have a particular preference for video gaming, user 129B can have a particular preference for exercise, and user 129C can have a particular preference for audio equipment).

However, consider the scenario where venue 1200 is associated with an optometry professional conference and users 129A-129C are all optometrists. In such a scenario, the new addition of eyeglasses object 1227 (FIG. 6A) into image representation 122, can conceivably draw the gaze of each of the users 129A-129C toward eyeglasses object 1227 to change the object selected for augmentation from plant object 1225 to eyeglasses object 1227 in the case that eyeglasses object 1227 is added to the scene defined by image representation 122 of FIG. 6A.

In the described scenario of Time T5, the percentage of non-registered users can be expected to drive weight $W_3$ of Eq. 1 upward to return a selection of an object for augmentation in accordance with factor $F_3$ to likely drive selection of the plant object for augmentation.

Referring to Table C, consider at Time T6, that all users in venue 1200 have exited except for user 129D who is a non-registered user. In the scenario described in connection with Time T6, the presenter activity continues to be the activity of the presenter talking on the topic of "gardening". In the scenario described with reference to Time T6, manager system 110 may not have access to data of user 129D and by default can apply the scoring function of Eq. 1 on factor $F_3$ only and because the presenter is talking about gardening can select the plant object 1225 for augmentation.

Referring to Time T7 of Table C, the single user 129D who is an unregistered user can remain within venue 1200 and the speech topic of the presenter associated with image representation 122 can change to a new topic. Namely, the topic of edible fruits. Manager system 110 applying the function of Eq. 1 for scoring the various candidate object representations of image representation 122 for augmentation can apply factor $F_3$ only and based on the presenter associated with image representation 122 talking about edible fruit can select bananas object 1222 for augmentation.

Manager system 110 at evaluation block 1109 can select one or more object representation of an image representation for augmentation. On completion of a selection at block 1109, manager system 110 can proceed to block 1110. At block 1110, manager system 110 can augment a selected one or more object for augmentation. For performance of block 1110, manager system 110 can send a communication for receipt by image server system 140 which receives the communication at block 1404 and activates the augmentation in accordance with the communication at block 1404.

For performing block 1110, manager system 110 can change values of pixel locations defining a representation of an object. For performing object augmentation, manager system 110 can selectively change pixel values at pixel locations defining one or more object of an image to the exclusion of remaining areas of an image representation so that the augmentation can be perceived by a user. According to one embodiment, an object augmentation performed by manager system 110 at block 1110 can include color popping of one or more object representation of an image representation. For performing color popping, a default image representation 122 can be configured by default as a monochrome image representation. For example, original image data, e.g. from a camera or a file can be color image data and at block 1106 on detection of presentment of an image session, manager system 110 can change pixel values of image data frames defining an image representation so that the color image data is presented in monochrome image data format, except for select locations of frames of image data representing an object, which select locations can be colorized by accessing of original color data from an image representation source, e.g. a camera or file. In the case where image representation 121/122 is a still image representation, pixel values representing objects within an image will not change from frame to frame because there is a single frame defining the image representation. Where an image representation 121/122 is a moving image representation, multiple successive frames of image data can define the image representation. In such a scenario, pixel locations associated with different objects within the image representation can be expected to change from frame to frame as objects move within a scene or as a camera position changes. A color pop augmentation herein can be accompanied by a color fade. With a color fade, edges of an object are gently faded from color format to monochrome for improvement of the aesthetics of the color pop.

Where manager system 110 operates on moving video image data, manager system 110 at block 1110 can designate a predetermined number of successive frames of image data to be subject to augmentation at block 1110. For example, can designate that a color pop is to occur for one second from a time of activation which can equate to sixty frames in the case of a 60 frames per second (FPS) video format. For performing augmentation with respect to an object that is moving in pixel space over time, manager system 110, for each new frame can track a changing location of each listed object in a prior frame so that with each new frame, manager system 110 performs augmentation at a proper location of an object, which as noted may be changing from frame to frame. Augmentation of an object representation as set forth herein can include features in addition or that are alternative with respect to color popping, e.g., can include brightening, flashing, enlarging, and/or supplemental indicia presentment associated with an object representation (e.g. an arrow, border, and the like). Manager system 110 in response to completion of block 1110 can proceed to block 1111.

At block 1111, manager system 110 can perform machine learning training. Machine learning training at block 1111 can include applying a new iteration of training data for training predictive models stored in data repository 108 in models area 2123 such as predictive models in accordance with predictive model 8002 as shown in FIG. 8 or predictive models in accordance with predictive model 9002 as shown in FIG. 9.

Referring to FIG. 9, FIG. 9 illustrates predictive model 9002 for use in returning predictions as to the performance augmentations features associated to an object augmentation performed by manager system 110. As set forth herein, an augmentation of an object performed by manager system 110 can feature a variety of attributes, e.g. a color pop, brightening, flashing, enlarging, and/or supplemental indicia. According to one embodiment, manager system 110 can be configured to vary features associated with object augmentations presented to users over time and can examine response data provided by users in response to the presented augmentations in order to adapt presented augmentations presented to users over time into a format that will return a best response of a user. The best response can be regarded to be the response featuring the longest duration gaze of the user on an augmented object.

Referring to FIG. 9, predictive model 9002 can be trained with iterations of training data. Each iteration of training data applied to predictive model 9002 can be associated to an augmentation event where an object is presented in augmented form to a user. Manager system 110 can instantiate an instance of predictive model 9002 for each user of system 100 and can train predictive model 9002 using training data from a plurality of sessions including a current presentation session and all previous presentation sessions participated in by a user for which predictive model 9002 has been trained. Each iteration of training data for use in training predictive model 9002 can include an augmentation profile and response data of a user. The response data can be a numerical value from 0.0 to 1.0 that increases in dependence on a strength of a user's gaze on an augmented object (as indicated e.g. in terms of duration and/or centeredness).

The augmentation profile can be an identifier for an augmentation presented to a user characterized by one or more augmentation features, e.g. color popping, brightening, flashing, enlarging, and/or indicia supplement. Predictive model 9002 once trained can be configured to respond to query data. Query data can include an identifier of a candidate augmentation profile. In response to application of query data, predictive model 9002 once trained can return a predicted response. The predicted response can be a predicted level of gaze of a user in response to a candidate augmentation profile, where the predicted gaze level can range in value from a value of 0.0-1.0.

Manager system 110 at block 1110 can use predictive model 9002 for performing augmentation of one or more object. In a single user scenario, e.g. scenarios depicted with reference to Times T1-T3, T6, and T7 of Table C and described with reference to location II of FIG. 2, manager system 110 at block 1110 can query predictive model 9002 for each candidate augmentation profile of a set of augmentation profiles and can select the predicted best performing profile as the selected augmentation profile for activation at block 1110. In a multiple user scenario, e.g. as described in connection with Time T4 of Table C, manager system 110 at block 1110 can for each user detected within an environment query predictive model 9002 for each augmentation profile of a set of augmentation profiles and can aggregate the results for the multiple users to identify predicted best performing augmentation profile of the set of augmentation profiles, and then at block 1110 can activate the identified best performing profile. Manager system 110 on completion of block 1111 can proceed to block 1112.

Various available tools, libraries, and/or services can be utilized for implementation of predictive model 8002 and/or predictive model 9002. For example, a machine learning service can provide access to libraries and executable code for support of machine learning functions. A machine learning service can provide access set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. According to one possible implementation, a machine learning service can provide access to libraries and a set of REST APIs that can be called from any programming language and that permit the integration of predictive analytics into any application. Enabled REST APIs can provide e.g. retrieval of metadata for a given predictive model, deployment of models and management of deployed models, online deployment, scoring, batch deployment, stream deployment, monitoring and retraining deployed models. Training predictive model 8002 and/or predictive model 9002 can include use of e.g. support vector machines (SVM), Bayesian networks, neural networks and/or other machine learning technologies.

At block 1112, manager system 110 can determine whether a current presentation session has ended. If a current session has not ended, manager system 110 can return to block 1107 to iteratively receive a next iteration of presentation session data at block 1107 and can iteratively perform the loop of blocks 1107-1112 until a time that a current presentation session has ended. When a presentation session has ended, as determined at block 1112, manager system 110 can proceed to block 1113.

At block 1113, manager system 110 can return to block 1101 to receive a next iteration of registration data which can include registration data of new users and which can also include updated registration data of existing users, and manager system 110 can iteratively perform the blocks of 1101-1113 for the deployment period of system 100.

With reference to blocks 1107-1112, it will be understood that manager system 110 can be supporting multiple instances of blocks 1107-1112 simultaneously, i.e. supporting multiple presentation environments at a given time.

Figure 6B:
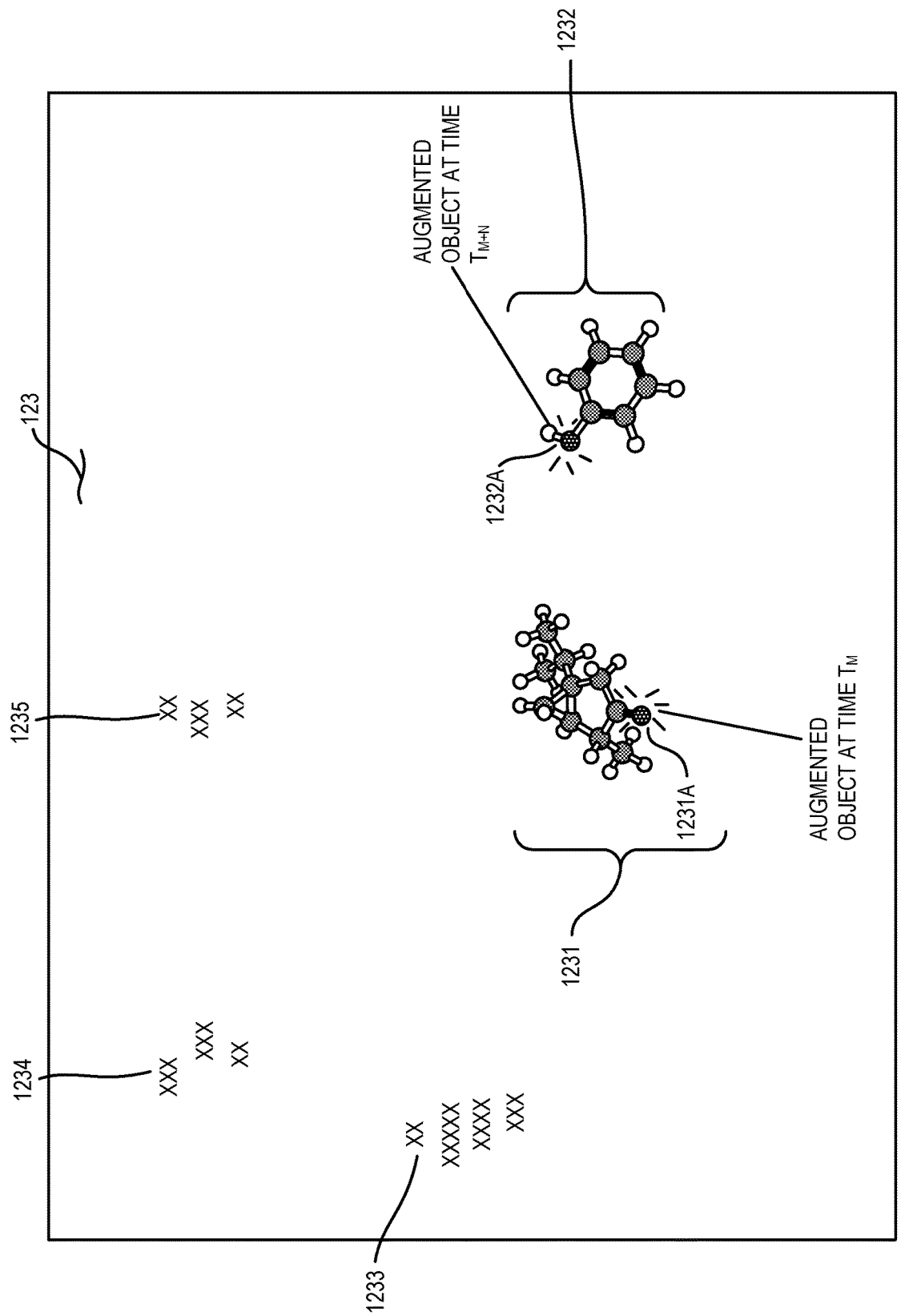
FIG. 6B depicts an image representation for presentment on a viewing device according to one embodiment.

Another use case is described in referenced to FIG. 6B, in which references image representation 123 which can be presented on a viewing device 120 as set forth herein. In the use case described with reference to FIG. 6B, an object augmentation can be synchronized with the presenter's voice content as set forth in reference to Times T6 and T7 in Table C. In the example of FIG. 6B, a presenter associated with image representation provided by a lecturer is giving a lecture relative to chemicals and the molecular makeup of specific compounds. The lecture can be dynamic and of free verbal spoken content. Manager system 110 in real time (e.g. without user perceivable delay) can be contextualizing the appropriateness to augment a particular molecule depicting defining a compound with attention gaining augmentation with respect to a particular molecule of a depicted chemical compound. Image representation 123 can include compound object representation 1231 depicting a first compound, compound object representation 1232 depicting a second compound, compound representation 1231 can include molecule object representation 1231A and compound object representation 1232 can include a molecule object representation 1232A. Image representation 123 presented on a display of viewing device 120 can further include object representations 1233, 1234, and 1235.

At block 1101, manager system 110 can be evaluating objects from an object list generated at block 1108 generated using received data received at block 1107. In one embodiment, a venue defining environment can be absent of any registered users and can include only unregistered users. In such a scenario as described by the operation of Eq. 1, manager system 110 can be configured so that object augmentation follows the topic of a spoken lecture spoken by a presenter associated with image representation 123. In the described scenario, topics can be resolved to a high resolution and include topics that specify an object such as a particular molecule.

At Time $T_M$ in the described scenario, a presenter can be discussing the molecule defining object 1231A and object 1231A can be augmented by manager system 110, e.g. by color popping. At Time $T_{M+N}$, the presenter can be discussing the molecule of object 1232A of compound 1232 and accordingly, at Time $T_{M+N}$, an augmentation by manager system 110 can transition from a prior augmentation of object 1231A to an augmentation of object 1232A. At a subsequent time after time $T_{M+N}$ a presenter can be discussing a second molecule of the compound 1232 and manager system 110 can transition the augmentation again so that a second molecule of compound 1232 is augmented.

Now, take into consideration the same scenario where the unregistered users are replaced with registered users. In the case the registered users have a strong historical session external preference for the topic of chemistry and in a current presentation session are gazing at a compound representation of image representation 123. Application of Eq. 1 can similarly drive the selection of object 1231A and object 1232A for augmentation selection.

However, take into consideration the scenario where the registered users have no session external data indicating a positive preference for chemistry, but rather are registered users who have a strong non-session preference for gardening and are attending a gardening lecture, but the lecturer has departed into a tangent discussion of molecular chemistry not likely to be of interest to the particular registered users viewing the presentation defined by image representation 123. In such a scenario, the registered users may be gazing, not at compound object representations but at another representation of an object within image representation 123, such as object representation (object) 1233 which can be an object representation of a full plant which manager system 110 can determine based on Eq. 1 will be more of interest to the particular described users who have provided session and non-session data indicating a positive preference for gardening. In the described scenario, application of Eq. 1 at Time $T_M$ and Time $T_{M+N}$ can drive the selection of an object for augmentation to be a selection of object 1233 rather than object 1231A or object 1232A. Accordingly, it can be seen that manager system 110 in one embodiment can be configured by default to synchronize the augmentation of objects with topics discussed by a presenter, except that manager system 110 can be restricted from synchronizing augmentation of objects with topics discussed by a presenter in the case where manager system 110 senses that the synchronized augmentation is unlikely to be of interest to recognized users in the environment of the presentation in which case manager system 110 can instead augment another object within an image representation.

Figure 7:
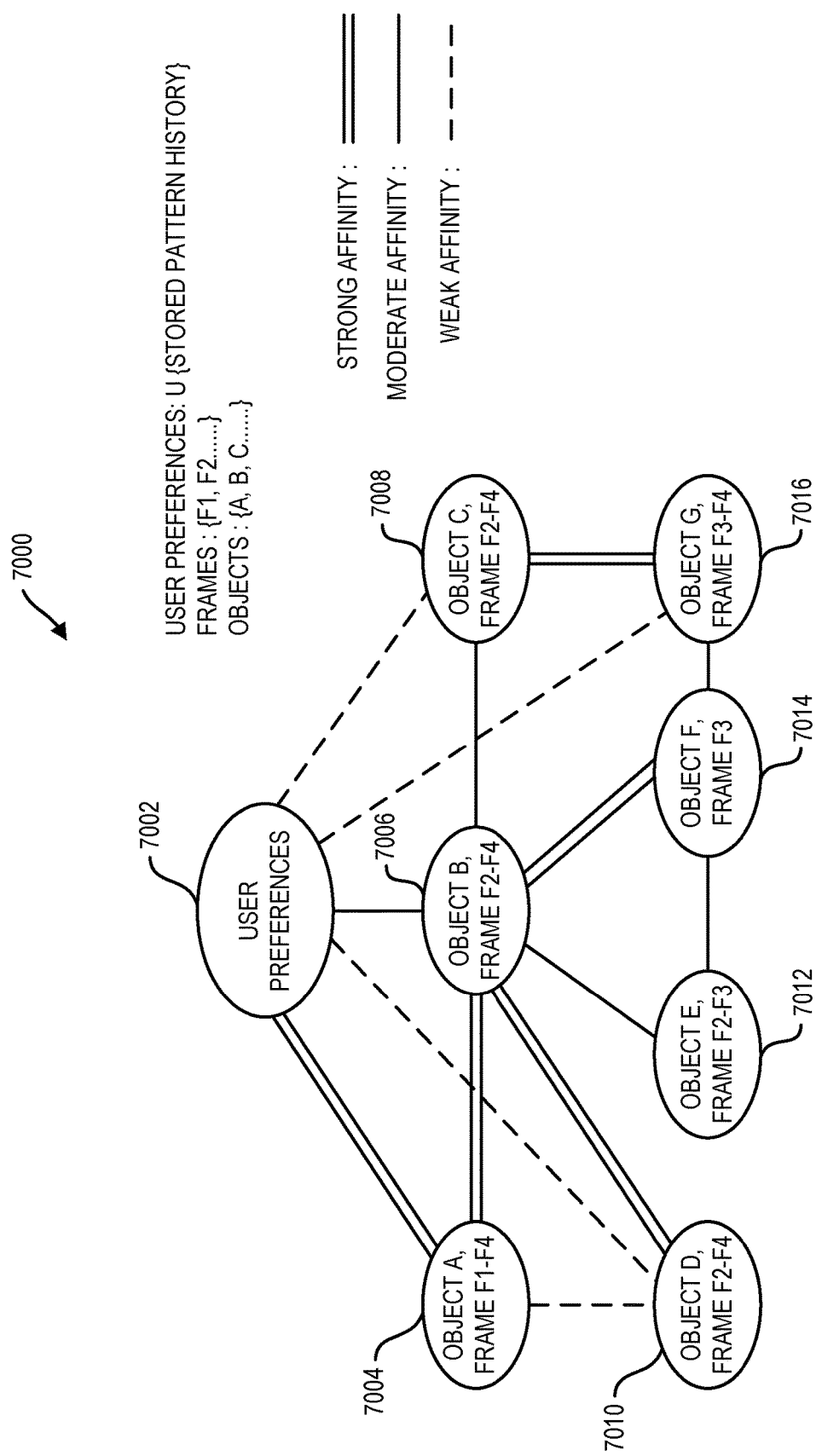
FIG. 7 depicts a relationship graph according to one embodiment.

For reduction of data storage requirements for frames and sessions in which multiple frames are displayed on one or more viewing device 120, manager system 110 can iteratively record presentation session data into a relationship graph 7000 as depicted in FIG. 7. According to one embodiment, generating an object list at block 1108 can include instantiating relationship graph 7000 in which there is instantiated one node for respective objects recognized within an image representation. Referring to FIG. 7 relationship graph 7000 can include a plurality of nodes. A root node 7002 of relationship graph 7000 can be user preferences representing the stored historical data including current session data of a user stored in user history area 2121 of data repository. The relationship graph 7000 of FIG. 7 summarizes session data for a fourth examined frame F4 of a session in which frames F1-F3 were previously examined. The frames F1-F4 can be a non-successive set of subsequent sample frames of a session e.g. sample frames 100 to 1000 frames apart.

Relationship graph 7000 can include as child nodes 7002-7016 objects that have been recognized in frames of image data of a session. Manager system 110 can store as child node data object identifiers and specifiers for frames in which the object was recognized. Manager system 110 can store as child node data an interest level value (SE) for an object attributable to all non-session data for an object (factor F1 data of Eq. 1) which data value is unlikely to change substantially during a data session. Referring to relationship graph 7000 it can be seen that object A was recognized in each of frame F1-F4, while object E was recognized only in frames F2 and F3. Manager system 110 can use the interest level values generated using Eq. 1 to populate the edge values of edges connecting the root node 7002 to nodes of currently recognized objects (for objects A, B, C, D and G).

According to one embodiment, manager system 110 can update relationship graph 7000 for each sample frame examined during a session. It can be seen that providing relationship graph 7000 in a configuration to be updated reduces processing resources. For example, the Eq. 1 data used for determining edge weights from frame to sample frame will be similar from frame to frame (and may differ only in respect to live session data) and so updated calculations can be performed from frame to sample frame with reduced queries of data repository 108. Simplified commands set can be utilized for updating node edges such command sets to retain prior edge value in the case of unchanged live session data. Because each object node can store an interest level data value (SE) indicating a user's level of interest attributable to user non-session data (Eq. 1 factor $F_1$ data) for the node, such SE data values do not have to be redetermined (requiring multiple queries of data repository 108) for each relationship graph update. With the recording of frame associations to object nodes, manager system 110 need not query underlying frame data of data repository 108 to determine a historical presence of an object within an image representation of a session. Rather manager system 110 can query relationship graph 7000 for such determination.

Relationship graph 7000 can reduce data storage requirements. For example, because relationship graph 7000 stores historical attributes of a session, manager system 110 can discard underlying data examined for Eq. 1 calculations, after calculations are performed. Manager system 110 can retain in presentation sessions area for a given session, a set of relationship graphs for the session (one per each session frame), and can intelligently discard underlying data for the sample frames. Manager system 110 according to one embodiment can discard a subset of relationship graphs of a session and can retain only sample set of relationship graphs for a session. According to one embodiment, manager system 110 can retain for respective sessions a last relationship of a session.

Relationship graph 7000 as depicted in FIG. 7 can record values for edges that connect object nodes of relationship graph. For example, for node 7004 (Object A) relationship graph 7000 records edge values for the edge between node 7004 and node 7006, and for the edge between node 7004 and node 7010.

With relationship graph 7000 updated and available, intuitive toolkit commands for programming manager system 110 to process frame image data can be provided that reference nodes and edges of relationship graph 7000 for operations.

Manager system 110 can populate object to object edge nodes using data cluster algorithms. According to one embodiment, manager system 110 can provide the edge weight between different object nodes based on categorizing similar objects under a particular cluster. For example, cluster 1 (based on identification of attributes like {cat, dog} can be clustered under animals and {geometry box, pen, pencil, rubber} under {student school toolkit} can be clustered under cluster 2. Clustering methodologies can include e.g., K-means and/or density-based spatial clustering of applications with noise (DBSCAN). Manager system 110 can iteratively identify and validate new clusters as a corpus of data within data repository 108 increases in size. For discovery of new clusters valid for a given user or a group of users, manager system 110 can plot a plurality of combinations of quantitative data values for examined objects (e.g. survey interest level v. posts interest level, survey interest level v. web browsing interest level, etc.) onto a scatterplot and can subject the scatterplot to cluster analysis. For discovery of new clusters in which related objects are represented, manager system 110 can additionally or alternatively use datasets provided from a dataset service external to system 100.

Populating object to object edge values with data values returned with use of cluster analysis can provide various advantages. For example, where user data for a given object is limited or non-existent, manager system 110 can query relationship graph 7000 for determination of a user's interest level in a particular object. According to one embodiment, cluster data can be stored in models area 2123 of data repository 108. Manager system 110 can be configured so that when each new object node is added to iteratively updated relationship graph 7000, manager system 110 queries the cluster data of data repository 108 to return edge values for preexisting object nodes of the relationship graph 7000. The edge values can be recorded as having weak, moderate, or strong affinity (or another quantitative scale). Manager system 110 for return of the edge values can measure Euclidean distance between objects plotted within the cluster data. Manager system 110 can assign stronger edge values for shorter Euclidian distances and weaker edge values for longer Euclidian distance so that assigned edge values are inversely related to cluster member Euclidian distances.

According to one embodiment, Eq. 2 above can be modified and provided as shown in Eq. 4

$$V_{F1} = E_{F1}W_1 + E_{F2}W_2 + E_{F3}W_3 + E_{F4}W_4 \quad \text{(Eq. 4)}$$

Manager system 110 can use Eq. 4 in the manner of Eq. 2 above except that Eq. 4 includes an additional factor $E_{F4}$ and associated weight W4, which is a cluster affinity factor. For determination of data values for factor $E_{F4}$, manager system 110 can query relationship graph 7000 for edge values indicating a cluster relationship to another object node. Where object to object edge values are identified, manager system 110 can assign $E_{F4}$ values of Eq. 4 based on such values. Referring to relationship graph 7000 as shown in FIG. 7, manager system 110 when examining frame 4, can query node 7016 to ascertain that object G is cluster related to object F and object C, and can return a data value under factor $E_{F4}$ for object G using the previously recorded SE scores for object F and object V in dependence on (e.g. in proportion to) to edge weights of edges connecting node 7016 to node 7014 (object F) and node 7008 (object C) respectively. According to one machine logic rule that can be employed for accelerated processing speed and reduced resource consumption, manager system 110 can be configured to avoid Eq. 4 calculations under factors $E_{F1}$-$E_{F4}$ when evaluating a newly recognized object for a session in the case that manager system 110 identified an object to object edge value specifying a strong affinity to another object and when such related object is identify can copy the SE value for the related node into the new node for the newly recognized object.

Manager system 110 can be configured so that edge weight W4 is increased if corpus data for return of data values under factor $E_{F1}$, $E_{F2}$, and $E_{F3}$ is limited or unavailable. Embodiment herein recognize that object to object edge weights of relationship graph 7000 can remain unchanged through a presentation session, thus reducing resource consumption which would be otherwise attributable to multiple queries of cluster data stored in data repository 108. Embodiments herein recognize that once a user's preferences are known with regard to one object in a cluster, that user's preferences can be interpolated to other cluster related objects, thus speeding the operation of system 100 and enhancing functionality in a variety of scenarios including in scenarios involving new users and/or new objects previously unrecognized by system 100.

Embodiments herein recognize that color popping in any photograph is a digital effect where part of a photograph is shown in color and remaining will be black and white or with faded colors. In this case, precise colors are shown in the selected object. This makes the target object more highlighted/focused and it becomes easy to catch the eye.

Embodiments herein recognize that in a social media system site, an image representation sharing feature is very popular where users tend to share various photographs with different filters. Apart from that, various image representation sharing sites are available, even in videos of different special effects-based photographs. An image pop effect as set forth herein can also be shown in still image representations or moving video image representations.

Embodiments herein can provide artificial intelligence (AI) enabled image popping systems that can analyze context and based on that said context, an AI system can dynamically augment appropriate object(s) in any image representation. According to one embodiment, context can be identified based on user's need and discovered by digestion of the user activities such as; their studying of a specific topic, trip, reviews, or plan to purchase one item and/or object. With this now known context there is now an advertisement opportunity as there is now known context for object tracking in videos etc. For example, based on the identified context an AI system herein can dynamically pop an object representation within an image representation for better focus and visual aesthetics/appeal to capture a user's attention and prolong engagement, thereby enhancing performance to a user interface defined by a viewing device. With prolonged engagement comes the opportunity to covey visual data to a user.

Embodiments herein recognize that human attention span is limited and a content porvider may have as little as from about 1.5 to about 3.0 seconds to capture and hold that a user viewers to convey useful data. Embodiments herein recognize that if a viewing user's attention span can be increased there is additional opportunity to convey useful data to a user. Embodiments herein set forth to intrigue a user by dynamically and intelligently, through use of AI features, digitally augmenting content within a displayed image representation which can be a still image representation or moving video image representation.

An AI system can be analyzing surrounding environmental context, user's needs, predicted point of attraction, historically gathered user's level of interest on different types of topics and/or objects in order to predict target objects in any image representation being presented to a user and accordingly, an AI based image popping system can execute an appropriate popping effect in the image representation.

By analyzing an historical eye focal point in different image objects to determine a user's current need and examining a user's historical preferences an AI system can identify which object of an image representation can be subject to an augmentation such as a color pop effect to enhance object priority and/or attention.

For example, first and second viewing users are talking about lipstick colors, so an AI system provided by manager system 110 can augment a lips object in an image representation having the recognizable object of lips; and if the system detects a different context, for instance, the first and second users are talking about dresses, then the AI system can subject the same image representation to a color pop effect on the dresses based on that previously captured context.

According to one embodiment, content providers can be predicting appropriate need of any user, and user's historical level of distraction pattern if multiple objects are present in an image representation will be identified, and accordingly a content provider can be creating an appropriate image augmentation e.g. color effect on the image representation so that it is eye catching content and will get priority attention from target users.

According to one embodiment, an AI system can be identifying the tracking need of any moving object in any moving video image representation, or comparative movement between any pair of more objects and accordingly, target objects of a moving video image representation can have image popping effect, such that users can visually recognize the movement pattern of the object.

According to one embodiment, an AI system can be used for video surveillance object tracking; hence the color popping effect can augment the object in motion and/or static image that benefit user interface performance by the additional context/focus/attention brought to it.

According to one embodiment, an AI system can be synchronizing the color popping effect with spoken content during any presentation where an AI system will be identifying which portion of any image representation is explained, and accordingly, color popping effect will be shown in the image representation.

According to one embodiment, one presenter can be explaining different body parts from an image representation showing a body (e.g. organism or machine body). In this case an AI system can synchronize a color popping effect so that in the image representation different body parts are selectively augmented in succession as they are discussed by a presenter.

According to one embodiment, a presenter provided by a lecturer is giving a lecture on chemicals and the molecular make up of specific compounds. The lecture is dynamic and of free verbal/spoken content, here, perhaps in real-time, the AI system can be contextualizing the appropriateness to highlight a particular molecule with attention gaining colors via image popping effects in the chemical makeup shown on a visual display (image/video) as pertinent to the lecture's conversation specifics.

An AI system e.g. provided by manager system 110 can apply image augmentation e.g. a color popping effect on an image representation by analyzing the contextual situation.

An AI system can historically be gathering user's interaction with various image representations, that includes eye tracking based identifying object of interest.

Historical data of user's voice can analyzed and will be comparing the same with user's need of tracking any object via e.g. Mel-frequency cepstral coefficient (MFCC) enabled speech features extraction and speech to text transcription processing in order to deploy latent Dirichlet allocation (LDA) (topic modelling) using NLP algorithm for keyword processing and semantic understanding of the spoken words. This generates contextual layers of focus for future object/image orientation and/or targeting.

A user's online photograph and product searches can also be tracked. Tracking can include, e.g., which object is being looking for, how the user wants to view the visual effect on an image representation, etc.

User's spoken, or product/purchase research study content-based activity can be identified and can be validating of whether an image object should be subject to augmentation.

A plurality of image representations can be analyzed and accordingly an AI system can be using a knowledge corpus to recognize objects within respective image representations.

The object decomposition of an image representation can be used to populate a directed such as a relationship graph. Each node can be a decomposed object and can represent a variable in the Bayesian sense. Going by examples these variables may be any object within an image representation, e.g. a person, a park bench, a cluster of flowers, or any arrangement of any objects of a similar nature in close proximity. These decomposed objects can represent observable variables; known objects. The edges between the objects can represent conditional dependencies. Object nodes that are not connected to one another can represent variables that are conditionally independent of each other.

Each decomposed object can be associated with a probability function that takes, as input, a particular set of values for the node's parent variables and gives (as output) the probability (or probability distribution, if applicable) of the variable represented by the node. Once a graph has been created, each conditional dependency can define an expressive and quantitative amount that lead the activation of an algorithm which performs the color popping effect.

By analyzing user's activity, including spoken content the AI system can be identifying the mobility pattern tracking identification need, and/or synchronizing the object tracking with presenter spoken content need.

When an image representation is displayed on a viewing device, then an AI system can be tracking the contextual need of the user and can be identifying how/if an object present in an image representation is related to the contextual need.

An AI based image popping effect can be applied on the image representation so that the user can visually recognize the object with greater attention/focus.

When any object tracking need is identified, then an AI system can be identifying the appropriate frames in any moving video image representation and accordingly identified frames will have color pop effect, so that when the video is played, then user can view the moving object with color popping effect.

Embodiments herein can be identifying a user's historical distraction pattern if multiple objects are present in a photograph. This pattern of distraction can be identified based on how long the user is maintaining eye focus on the object.

Certain embodiments herein may offer various technical computing advantages involving computing advantages to address problems arising in the realm of computer networks and computer systems. Embodiments herein can improve operation of computer systems in reference to their performance as user interfaces featured to maintain engagement of users interacting with such user interfaces. Embodiments herein can dynamically adapt an object augmented within an image representation in dependence on live action of a user during a current presentation session in which image data is presented to a user. In such manner, attention of the user can be prolonged. A method for prolonging the attention of the user can be dynamically determined in dependence on live feedback of the user. Embodiments herein can adaptively respond, not only to live actions of viewing users, but also changing attributes of an environment in which a viewing device operates. According to one embodiment, presented object augmentations of a user can be synchronized to a presenter's spoken topics by default. The default operation can be overridden in the case that sensed data of users viewing a presentation are likely to be influenced to commit longer attention to an augmented object with an alternative augmentation scheme. Accordingly, it can be seen that embodiments can be configured to synchronize the augmentation of objects with topics discussed by a presenter, except in some embodiments where it can be sensed that the synchronized augmentation is unlikely to be of interest to particular users in the environment of the presentation, and alternate augmentation scheme can be activated. Embodiments herein can employ relationship graphs for recording changes in an image representation over time. Relationship graphs can facilitate various technical computing advantages such as may include a reduction of data queries of a data repository. Embodiments herein can include enhanced location based services (LBS) to that functionality of a defined user interface is in dependence on an environment classification that is based on detected locations of users. A fundamental aspect of operation of a computer system is its interoperation to which it operates including human actors. By increasing the accuracy and reliability of information presented to human users, embodiments herein increase the level of engagement of human users for enhanced computer system operation. Predictive models as set forth herein can be trained by machine learning using historical data so that accuracy and reliability is iteratively improved over time without resource consuming rules intensive processing. Machine learning processes can be performed for increased accuracy and for reduction of reliance on rules based criteria and thus reduced computational overhead. For enhancement of computational accuracies, embodiments can feature computational platforms existing only in the realm of computer networks such as artificial intelligence platforms, and machine learning platforms. Embodiments herein can employ data structuring processes, e.g. processing for transforming unstructured data into a form optimized for computerized processing. Embodiments herein can examine data from diverse data sources such as data sources that process radio signals for location determination of users. Embodiments herein can include artificial intelligence (AI) processing platforms featuring improved processes to transform unstructured data into structured form permitting computer based analytics and decision making. Embodiments herein can include particular arrangements for both collecting rich data into a data repository and additional particular arrangements for updating such data and for use of that data to drive artificial intelligence decision making. Certain embodiments may be implemented by use of a cloud platform/data center in various types including a Software-as-a-Service (SaaS), Platform-as-a-Service (PaaS), Database-as-a-Service (DBaaS), and combinations thereof based on types of subscription.

Figure 10:
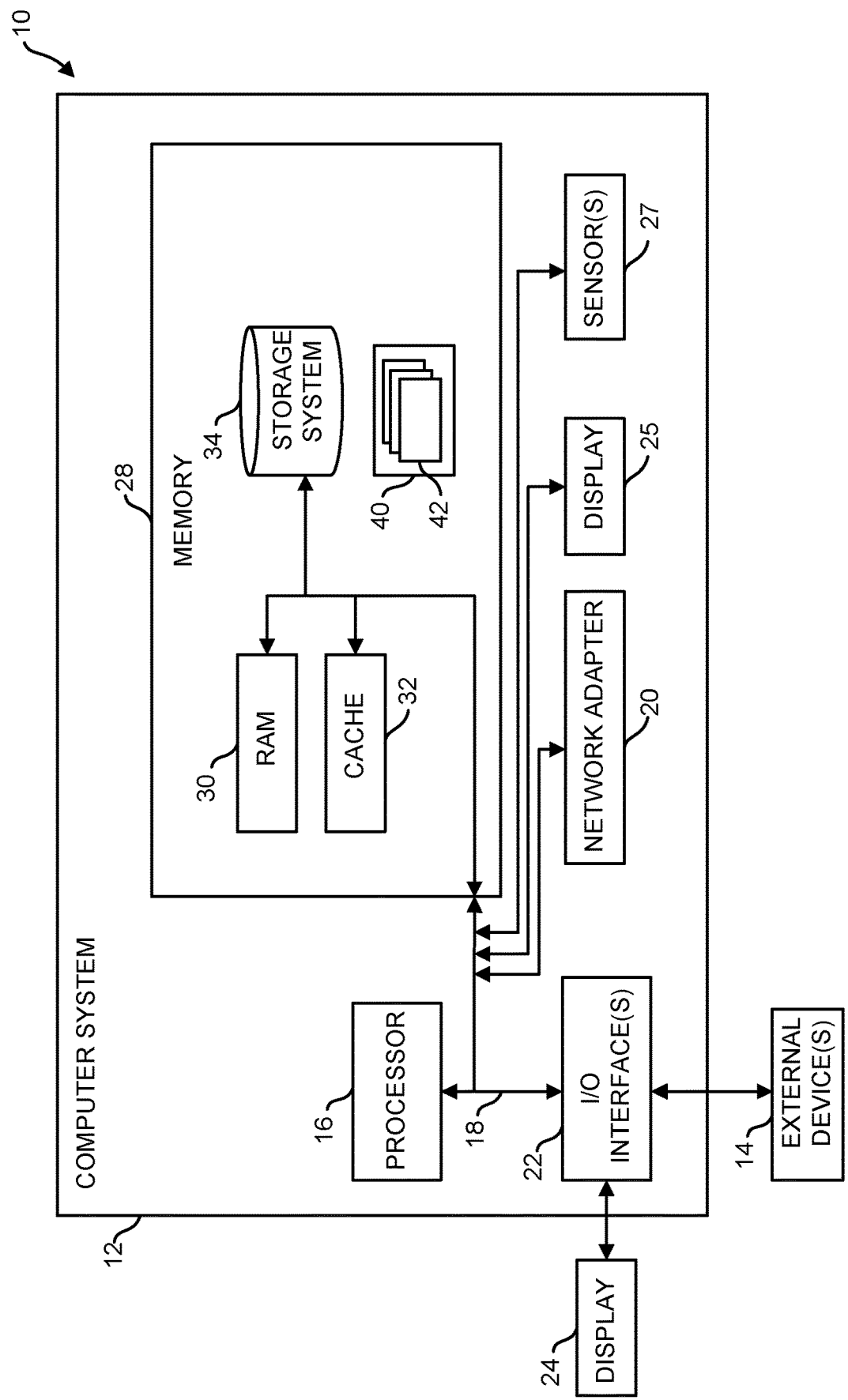
FIG. 10 depicts a computing node according to one embodiment.
Figure 11:
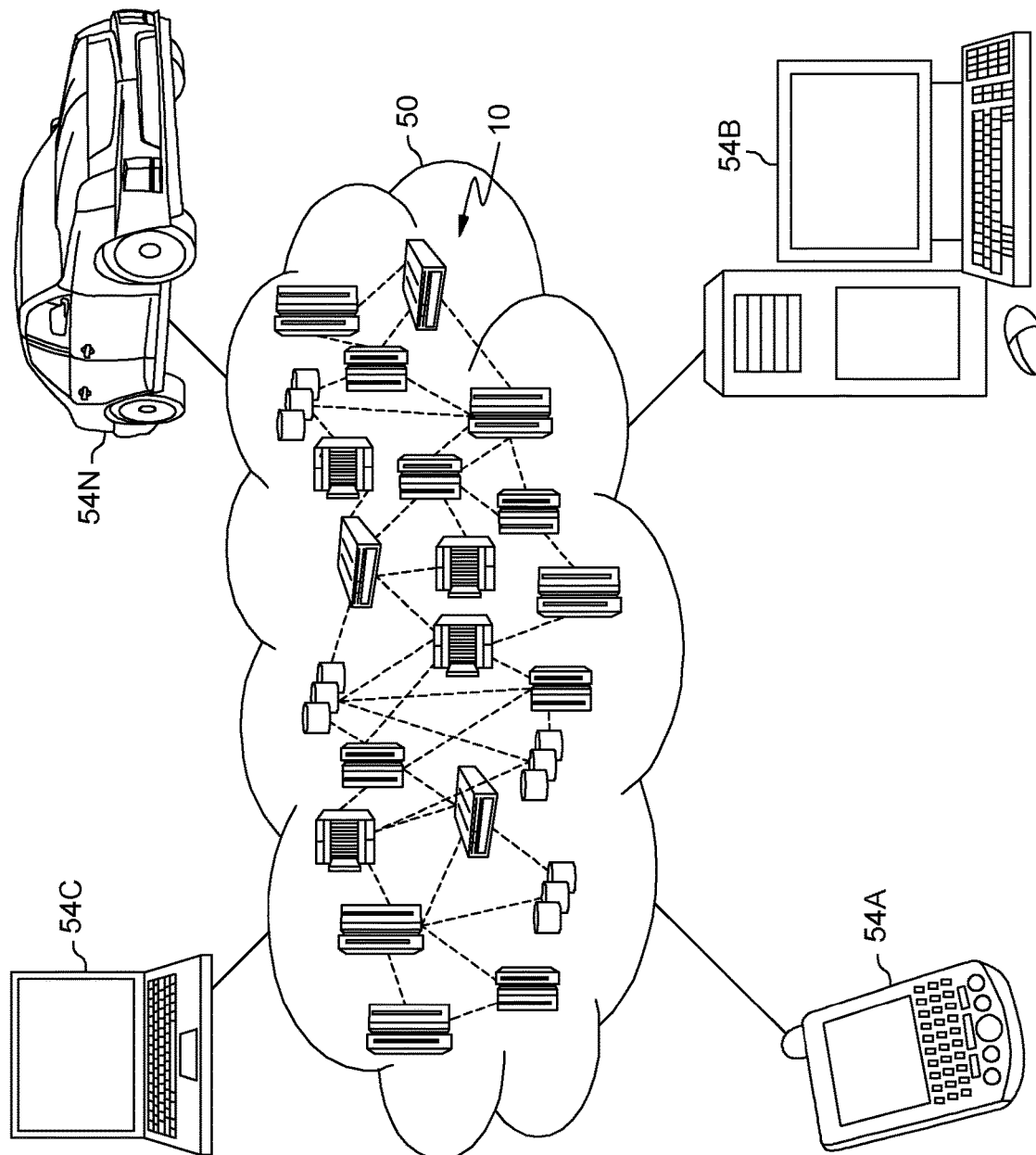
FIG. 11 depicts a cloud computing environment according to one embodiment.
Figure 12:
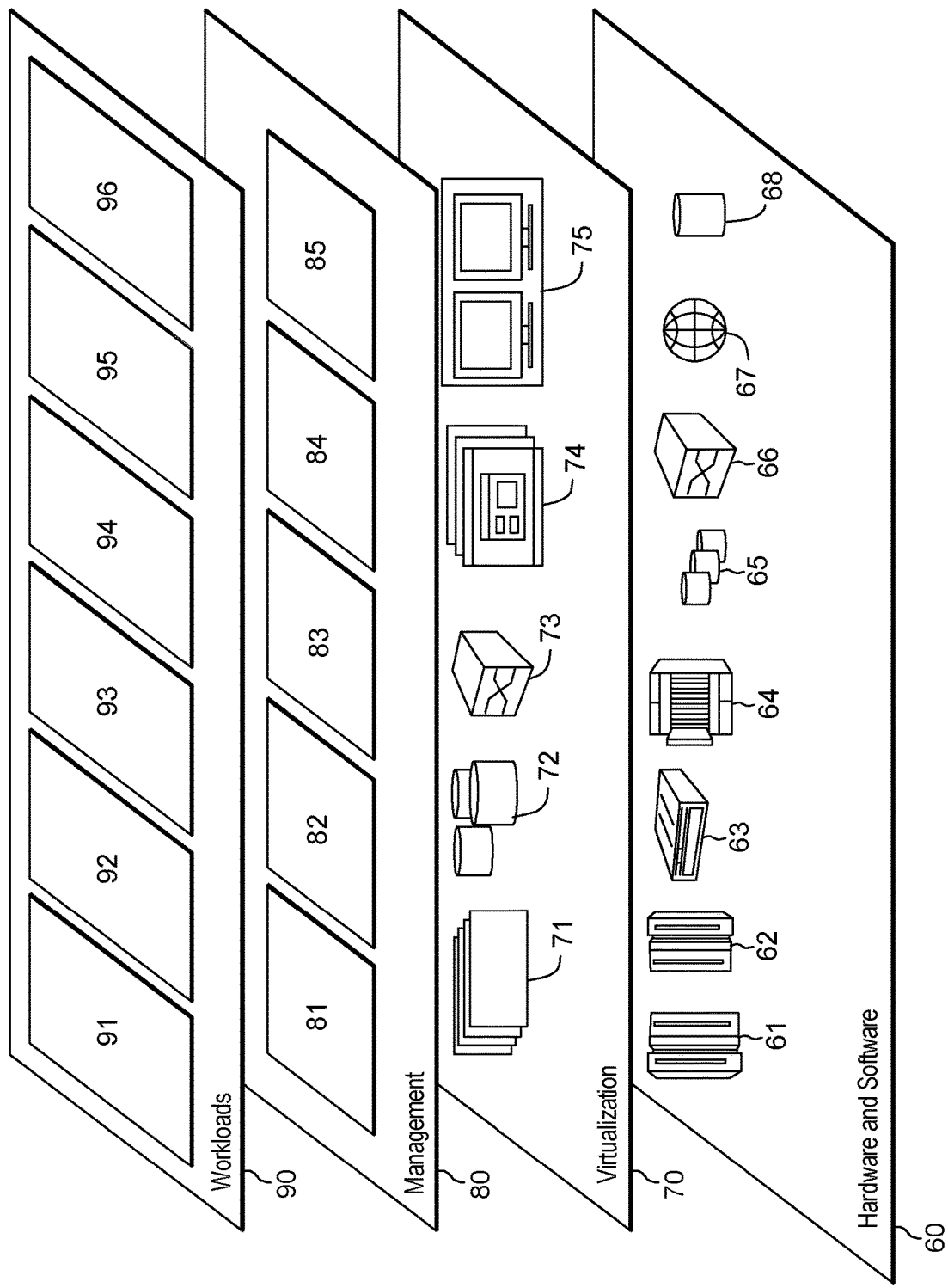
FIG. 12 depicts abstraction model layers according to one embodiment.

FIGS. 10-12 depict various aspects of computing, including a computer system and cloud computing, in accordance with one or more aspects set forth herein.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 10, a schematic of an example of a computing node is shown. Computing node 10 is only one example of a computing node suitable for use as a cloud computing node and is not intended to suggest any limitation as to the scope of use or functionality of embodiments of the invention described herein. Regardless, computing node 10 is capable of being implemented and/or performing any of the functionality set forth hereinabove. Computing node 10 can be implemented as a cloud computing node in a cloud computing environment, or can be implemented as a computing node in a computing environment other than a cloud computing environment.

In computing node 10 there is a computer system 12, which is operational with numerous other general purpose or special purpose computing system environments or configurations. Examples of well-known computing systems, environments, and/or configurations that may be suitable for use with computer system 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 12 may be described in the general context of computer system-executable instructions, such as program processes, being executed by a computer system. Generally, program processes may include routines, programs, objects, components, logic, data structures, and so on that perform particular tasks or implement particular abstract data types. Computer system 12 may be practiced in distributed cloud computing environments where tasks are performed by remote processing devices that are linked through a communications network. In a distributed cloud computing environment, program processes may be located in both local and remote computer system storage media including memory storage devices.

As shown in FIG. 10, computer system 12 in computing node 10 is shown in the form of a computing device. The components of computer system 12 may include, but are not limited to, one or more processor 16, a system memory 28, and a bus 18 that couples various system components including system memory 28 to processor 16. In one embodiment, computing node 10 is a computing node of a non-cloud computing environment. In one embodiment, computing node 10 is a computing node of a cloud computing environment as set forth herein in connection with FIGS. 11-12.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system 12 typically includes a variety of computer system readable media. Such media may be any available media that is accessible by computer system 12, and it includes both volatile and non-volatile media, removable and non-removable media.

System memory 28 can include computer system readable media in the form of volatile memory, such as random access memory (RAM) 30 and/or cache memory 32. Computer system 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program processes that are configured to carry out the functions of embodiments of the invention.

One or more program 40, having a set (at least one) of program processes 42, may be stored in memory 28 by way of example, and not limitation, as well as an operating system, one or more application programs, other program processes, and program data. One or more program 40 including program processes 42 can generally carry out the functions set forth herein. In one embodiment, manager system 110 can include one or more computing node 10 and can include one or more program 40 for performing functions described with reference to manager system 110 as set forth in the flowchart of FIG. 3. In one embodiment, one or more client computer device 130A-130Z can include one or more computing node 10 and can include one or more program 40 for performing functions described with reference to one or more client computer device 130A-130Z as set forth in the flowchart of FIG. 3. In one embodiment, sensor system 125 can include one or more computing node 10 and can include one or more program 40 for performing functions described with reference to sensor system 125 as set forth in the flowchart of FIG. 3. In one embodiment, viewing device 120 can include one or more computing node 10 and can include one or more program 40 for performing functions described with reference to viewing device 120 as set forth in the flowchart of FIG. 3. In one embodiment, social media system 150 can include one or more computing node 10 and can include one or more program 40 for performing functions described with reference to social media system 150 as set forth in the flowchart of FIG. 3. In one embodiment, the computing node based systems and devices depicted in FIG. 1 can include one or more program for performing function described with reference to such computing node based systems and devices.

Computer system 12 may also communicate with one or more external devices 14 such as a keyboard, a pointing device, a display 24, etc.; one or more devices that enable a user to interact with computer system 12; and/or any devices (e.g., network card, modem, etc.) that enable computer system 12 to communicate with one or more other computing devices. Such communication can occur via Input/Output (I/O) interfaces 22. Still yet, computer system 12 can communicate with one or more networks such as a local area network (LAN), a general wide area network (WAN), and/or a public network (e.g., the Internet) via network adapter 20. As depicted, network adapter 20 communicates with the other components of computer system 12 via bus 18. It should be understood that although not shown, other hardware and/or software components could be used in conjunction with computer system 12. Examples, include, but are not limited to: microcode, device drivers, redundant processing units, external disk drive arrays, RAID systems, tape drives, and data archival storage systems, etc. In addition to or in place of having external devices 14 and display 24, which can be configured to provide user interface functionality, computing node 10 in one embodiment can include display 25 connected to bus 18. In one embodiment, display 25 can be configured as a touch screen display and can be configured to provide user interface functionality, e.g. can facilitate virtual keyboard functionality and input of total data. Computer system 12 in one embodiment can also include one or more sensor device 27 connected to bus 18. One or more sensor device 27 can alternatively be connected through I/O interface(s) 22. One or more sensor device 27 can include a Global Positioning Sensor (GPS) device in one embodiment and can be configured to provide a location of computing node 10. In one embodiment, one or more sensor device 27 can alternatively or in addition include, e.g., one or more of a camera, a gyroscope, a temperature sensor, a humidity sensor, a pulse sensor, a blood pressure (bp) sensor or an audio input device. Computer system 12 can include one or more network adapter 20. In FIG. 11 computing node 10 is described as being implemented in a cloud computing environment and accordingly is referred to as a cloud computing node in the context of FIG. 11.

Referring now to FIG. 11, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing components 96 for digitally augmenting image representations as set forth herein. The processing components 96 can be implemented with use of one or more program 40 described in FIG. 10.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains"

one or more features possesses those one or more features, but is not limited to possessing only those one or more features. Forms of the term "based on" herein encompass relationships where an element is partially based on as well as relationships where an element is entirely based on. Methods, products and systems described as having a certain number of elements can be practiced with less than or greater than the certain number of elements. Furthermore, a device or structure that is configured in a certain way is configured in at least that way, but may also be configured in ways that are not listed.

It is contemplated that numerical values, as well as other values that are recited herein are modified by the term "about", whether expressly stated or inherently derived by the discussion of the present disclosure. As used herein, the term "about" defines the numerical boundaries of the modified values so as to include, but not be limited to, tolerances and values up to, and including the numerical value so modified. That is, numerical values can include the actual value that is expressly stated, as well as other values that are, or can be, the decimal, fractional, or other multiple of the actual value indicated, and/or described in the disclosure.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A computer implemented method comprising:
    obtaining image data of an image representation that is being displayed on one or more viewing device during an image representation presentation session, the image representation provided by a moving video image representation having successive frames of image data, wherein the image representation is being viewed by one or more viewer user;
    performing object recognition on at least one frame of image data of the successive frames of image data, and generating a list of object representations within the at least one frame of image data, the list of object representations including identifiers for respective object representations included within the image representation;
    evaluating one or more object referenced in the list of object representations, the evaluating including predicting an interest level of the one or more viewer user in the one or more object referenced in the list of object representations; and
    digitally augmenting a presented representation of at least one object referenced in the list of object representations in dependence on the evaluating the one or more object, wherein frames of the successive frames have an associated presenter that verbally narrates the frames, wherein the method includes subjecting voice data of the presenter to Natural Language Processing to extract data tags, and wherein the digitally augmenting the presented representation of the at least one object referenced in the list of object representations is performed in dependence on the data tags.

2. The computer implemented method of claim 1, wherein the evaluating includes applying a multifactor function, wherein the multifactor function includes a first session external factor, a second session factor and a third presenter factor.

3. The computer implemented method of claim 1, wherein the method includes detecting an attribute of an environment of the presentation session, wherein the evaluating includes applying a multifactor function, the multifactor function including a first session external factor, a second session factor and a third presenter factor, and wherein the method includes adjusting the multifactor function in dependence on the detecting.

4. The computer implemented method of claim 1, wherein the method includes detecting an attribute of an environment of the presentation session, wherein the evaluating includes querying a trained predictive model that has been trained with training data of the one or more viewer user to predict a response of the one more viewer user to a candidate object augmentation, and wherein the method includes adjusting the multifactor function in dependence on the detecting.

5. The computer implemented method of claim 1, wherein the performing object recognition on at least one frame of image data of the successive frames of image data includes iteratively performing object recognition with respect to a plurality of subsequent frames, wherein the evaluating the one or more object referenced in the list of object representations includes iteratively performing the evaluating for respective ones of the plurality of subsequent frames using iteratively received live feedback data of the one or more viewer user received during the presentation session so that a result of the evaluating iteratively changes during the presentation session in dependence on the live feedback data, and wherein digitally augmenting is performed iteratively so that an augmented object within the image representation transitions from a first object to a second object in dependence on the recognizing and the evaluating.

6. The computer implemented method of claim 1, wherein the performing object recognition on at least one frame of image data of the successive frames of image data includes iteratively performing object recognition with respect to a plurality of subsequent frames, wherein the evaluating the one or more object referenced in the list of object representations includes iteratively performing the evaluating for respective ones of the plurality of subsequent frames using iteratively received live feedback data of the one or more viewer user received during the presentation session so that a result of the evaluating iteratively changes during the presentation session in dependence on the live feedback data, and wherein digitally augmenting is performed iteratively so that an augmented object within the image representation transitions from a first one or more object synchronized to extracted topics of the presenter extracted by the Natural Language Processing to a second one or more object not synchronized to the extracted topics of the presenter in dependence on the recognizing and the evaluating.

7. The computer implemented method of claim 1, wherein the performing object recognition on at least one frame of image data of the successive frames of image data includes iteratively performing object recognition with respect to a plurality of subsequent frames, wherein the evaluating the one or more object referenced in the list of object representations includes iteratively performing the evaluating for respective ones of the plurality of subsequent frames using iteratively received live feedback data of the one or more viewer user received during the presentation session so that a result of the evaluating iteratively changes during the presentation session in dependence on the live feedback data, wherein the using iteratively received live feedback data of the one or more viewer user includes subjecting voice data of the one or more viewer user to Natural Language Processing to extract topic data of the one or more viewer, wherein the using iteratively received live feedback data of the one or more viewer user includes examining eye gaze data of the one or more view user as output by one or more respective eye tracker sensor device, and wherein the using iteratively received live feedback data of the one or more viewer user includes subjecting video camera image representations of the one or more viewer to facial recognition processing, and wherein digitally augmenting is performed iteratively so that an augmented object within the image representation transitions from a first one or more object synchronized to extracted topics of the presenter extracted by the Natural Language Processing to a second one or more object not synchronized to the extracted topics of the presenter in dependence on the recognizing and the evaluating.

8. The computer implemented method of claim 1, wherein the performing object recognition on at least one frame of image data of the successive frames of image data includes iteratively performing object recognition with respect to a plurality of subsequent frames, wherein the evaluating the one or more object referenced in the list of object representations includes iteratively performing the evaluating for respective ones of the plurality of subsequent frames using iteratively received live feedback data of the one or more viewer user received during the presentation session so that a result of the evaluating iteratively changes during the presentation session in dependence on the live feedback data, wherein the live feedback data specifies that an eye gaze of a plurality of view users has transitioned from a distribution of different objects to a certain object during the plurality of subsequent frames and wherein digitally augmenting is performed iteratively so that an augmented object within the image representation transitions from a first object to the certain object in dependence on the recognizing and the evaluating.

9. The computer implemented method of claim 1, wherein the performing object recognition on at least one frame of image data of the successive frames of image data includes iteratively performing object recognition with respect to a plurality of subsequent frames of the successive frames, wherein the evaluating the one or more object referenced in the list of object representations includes iteratively performing the evaluating for respective ones of the plurality of subsequent frames using iteratively received live feedback data of the one or more viewer user received during the presentation session so that a result of the evaluating iteratively changes during the presentation session in dependence on the live feedback data, wherein the method includes detecting a change in an environment of the presentation session from a first state to a second state, wherein the first state is characterized by a single viewer user provided by a first user viewing the image representation, wherein the second state is characterized by multiple users including the first user and a second user viewing the image representation, wherein the evaluating with the first state active includes examining live feedback data of the first user, wherein the evaluating with the first state active is absent of examining live feedback data of the second user, wherein the evaluating with the second state active includes examining live feedback data of the first user and the second user, and wherein digitally augmenting is performed iteratively so that an augmented object within the image representation transitions from a first object to a second object in dependence on the recognizing and the evaluating.

10. The computer implemented method of claim 1, wherein generating the list of object representations includes instantiating a relationship graph in which respective object representations of the list of object representations are represented as object nodes of the relationship graph, wherein the method includes recording as node data of the object nodes user data of a certain user viewing the presentation session.

11. A computer program product comprising:
a computer readable storage medium readable by one or more processing circuit and storing instructions for execution by one or more processor for performing a method comprising:
obtaining image data of an image representation that is being displayed on one or more viewing device during an image representation presentation session, the image representation provided by a moving video image representation having successive frames of image data, wherein the image representation is being viewed by one or more viewer user, and wherein the image representation is served by a server system external to respective ones of the one or more viewing device;
performing object recognition on at least one frame of image data of the successive frames of image data, and generating a list of object representations within the at least one frame of image data, the list of object representations including identifiers for respective object representations included within the image representation;
evaluating one or more object referenced in the list of object representations, the evaluating including predicting an interest level of the one or more viewer user in the one or more object referenced in the list of object representations; and
digitally augmenting a presented representation of at least one object referenced in the list of object representations in dependence on the evaluating the one or more object, wherein the list of object representations provides for respective object representations a set of pixel locations, the set of pixel locations specifying locations within a frame of image data in which an object having an object identifier is represented.

12. The computer implemented method of claim 1, wherein generating the list of object representations includes instantiating a relationship graph in which respective object representations of the list of object representations are represented as object nodes of the relationship graph, wherein the method includes recording as node data of the object nodes user data of a certain user viewing the presentation session, wherein the relationship graph includes object node to object node edges, the object node edges having edge values that specify an affinity between objects of connected object nodes of the relationship graph, wherein the performing object recognition on at least one frame of image data of the successive frames of image data includes iteratively performing object recognition with respect to a plurality of subsequent frames and updating the relationship graph based on the iteratively performing object recognition so that the relationship graph defines an iteratively updated relationship graph, wherein the evaluating the one or more object referenced in the list of object representations includes iteratively performing the evaluating for respective ones of the plurality of subsequent frames using iterative queries of the iteratively updated relationship graph, wherein the method includes maintaining cluster data within a data repository, performing cluster analysis to identify clusters of related objects within the cluster data, and populating the edge values with use of queries of the cluster data.

13. The computer program product of claim 11, wherein the method includes detecting an attribute of an environment of the presentation session, wherein the evaluating includes applying a multifactor function, the multifactor function including a first session external factor, a second session factor and a third presenter factor, and wherein the method includes adjusting the multifactor function in dependence on the detecting, wherein the method includes detecting an attribute of an environment of the presentation session, wherein the evaluating includes querying a trained predictive model that has been trained with training data of the one or more viewer user to predict a response of the one or more viewer user to a candidate object augmentation, and wherein the method includes adjusting the multifactor function in dependence on the detecting, wherein the digitally augmenting includes color popping the at least one object, wherein the performing object recognition on at least one frame of image data of the successive frames of image data includes iteratively performing object recognition with respect to a plurality of subsequent frames, wherein the evaluating the one or more object referenced in the list of object representations includes iteratively performing the evaluating for respective ones of the plurality of subsequent frames using iteratively received live feedback data of the one or more viewer user received during the presentation session so that a result of the evaluating iteratively changes during the presentation session in dependence on the live feedback data, wherein the using iteratively received live feedback data of the one or more viewer user includes subjecting voice data of the one or more viewer user to Natural Language Processing to extract topic data of the one or more viewer, wherein the using iteratively received live feedback data of the one or more viewer user includes examining eye gaze data of the one or more view user as output by one or more respective eye tracker sensor device, and wherein the using iteratively received live feedback data of the one or more viewer user includes subjecting video camera image representations of the one or more viewer to facial recognition processing, wherein the plurality of subsequent frames have an associated presenter that verbally narrates the subsequent frames, wherein the method includes subjecting voice data of the presenter to Natural Language Processing to extract topic data of the presenter, and wherein digitally augmenting is performed iteratively so that an augmented object within the image representation transitions from a first one or more object synchronized to extracted topics of the presenter extracted by the Natural Language Processing to a second one or more object not synchronized to the extracted topics of the presenter in dependence on the recognizing and the evaluating, wherein generating the list of object representations includes instantiating a relationship graph in which respective object representations of the list of object representations are represented as object nodes of the relationship graph, wherein the method includes recording as node data of the object nodes user data of a certain user viewing the presentation session, wherein the relationship graph includes object node to object node edges, the object node edges having edge values that specify an affinity between objects of connected object nodes of the relationship graph, wherein the performing object recognition on at least one frame of image data of the successive frames of image data includes iteratively performing object recognition with respect to a plurality of subsequent frames and updating the relationship graph based on the iteratively performing object recognition so that the relationship graph defines an iteratively updated relationship graph, wherein the evaluating the one or more object referenced in the list of object representations includes iteratively performing the evaluating for respective ones of the plurality of subsequent frames using iterative queries of the iteratively updated relationship graph, wherein the method includes maintaining cluster data within a data repository, performing cluster analysis to identify clusters of related objects within the cluster data, and populating the edge values with use of queries of the cluster data.

14. The computer program product of claim 11, wherein generating the list of object representations includes instantiating a relationship graph in which respective object representations of the list of object representations are represented as object nodes of the relationship graph, wherein the method includes recording as node data of the object nodes user data of a certain user viewing the presentation session, wherein the relationship graph includes object node to object node edges, the object node edges having edge values that specify an affinity between objects of connected object nodes of the relationship graph, wherein the performing object recognition on at least one frame of image data of the successive frames of image data includes iteratively performing object recognition with respect to a plurality of subsequent frames and updating the relationship graph based on the iteratively performing object recognition so that the relationship graph defines an iteratively updated relationship graph, wherein the evaluating the one or more object referenced in the list of object representations includes iteratively performing the evaluating for respective ones of the plurality of subsequent frames using iterative queries of the iteratively updated relationship graph.

15. A system comprising:
   a memory;
   at least one processor in communication with the memory; and
   program instructions executable by one or more processor via the memory to perform a method comprising:
      obtaining image data of an image representation that is being displayed on one or more viewing device during an image representation presentation session, the image representation provided by a moving video image representation having successive frames of image data, wherein the image representation is being simultaneously viewed by a plurality of viewer users;
      performing object recognition on at least one frame of image data of the successive frames of image data, and generating a list of object representations within the at least one frame of image data, the list of object representations including identifiers for respective object representations included within the image representation;
      evaluating one or more object referenced in the list of object representations, the evaluating including predicting an aggregate interest level of the plurality of viewer users in the one or more object referenced in the list of object representations; and digitally augmenting a presented representation of at least one object referenced in the list of object representations in dependence on the evaluating the one or more object.

16. The computer implemented method of claim 1, wherein the evaluating includes querying a trained predictive model that has been trained with training data of the one or more viewer user to predict a response of the one or more viewer user to a candidate object augmentation, and wherein the method includes performing the digitally augmenting of the presented representation in dependence on a result of the querying the trained predictive model that has been trained with training data of the one or more viewer user to predict the response of the one or more viewer user to the candidate object augmentation.

17. The computer program product of claim 11, wherein frames of the successive frames have an associated presenter that verbally narrates the frames, wherein the method includes subjecting voice data of the presenter to Natural Language Processing to extract data tags, and wherein the digitally augmenting the presented representation of the at least one object referenced in the list of object representations is performed in dependence on the data tags.

18. The computer implemented method of claim 1, wherein the method includes iteratively subjecting voice data of the presenter to Natural Language Processing to extract topics of the presenter that map to objects represented in the image representation, and wherein the digitally augmenting is performed iteratively so that an object representation of the image representation that is currently augmented by the digitally augmenting transitions iteratively and is synchronized to an iteratively transitioning current topic of the presenter extracted by the iteratively subjecting the voice data of the presenter to Natural Language Processing.

19. The computer implemented method of claim 1, wherein the evaluating the one or more object referenced in the list of object representations includes iteratively performing the evaluating for respective ones of the plurality of subsequent frames using iteratively received live feedback data of the one or more viewer user received during the presentation session so that a result of the evaluating iteratively changes during the presentation session in dependence on the live feedback data, wherein the using iteratively received live feedback data of the one or more viewer user includes using extracted facial expression data of the one or more viewer user extracted during the presentation session.

20. The computer implemented method of claim 1, wherein the list of object representations provides for respective object representations a set of pixel locations, the set of pixel locations specifying locations within a frame of image data in which an object having an object identifier is represented.

* * * * *